US012545950B2

(12) United States Patent
Wang et al.

(10) Patent No.: US 12,545,950 B2
(45) Date of Patent: Feb. 10, 2026

(54) METHODS FOR PREPARING CDNA SAMPLES FOR RNA SEQUENCING, AND CDNA SAMPLES AND USES THEREOF

(71) Applicant: QIAGEN Sciences, LLC, Germantown, MD (US)

(72) Inventors: Yexun Wang, Ellicott City, MD (US); Marcus Lewis, Clarksburg, MD (US)

(73) Assignee: QIAGEN Sciences, LLC, Germantown, MD (US)

( * ) Notice: Subject to any disclaimer, the term of this patent is extended or adjusted under 35 U.S.C. 154(b) by 1146 days.

(21) Appl. No.: 17/311,521

(22) PCT Filed: Dec. 6, 2019

(86) PCT No.: PCT/US2019/064977
§ 371 (c)(1),
(2) Date: Jun. 7, 2021

(87) PCT Pub. No.: WO2020/118200
PCT Pub. Date: Jun. 11, 2020

(65) Prior Publication Data
US 2022/0017954 A1    Jan. 20, 2022

Related U.S. Application Data

(60) Provisional application No. 62/776,697, filed on Dec. 7, 2018.

(51) Int. Cl.
*C12Q 1/6853* (2018.01)
*C12Q 1/6848* (2018.01)

(52) U.S. Cl.
CPC ......... *C12Q 1/6853* (2013.01); *C12Q 1/6848* (2013.01)

(58) Field of Classification Search
CPC ... C12Q 1/6853; C12Q 1/6848; C12Q 1/6806
See application file for complete search history.

(56) References Cited

U.S. PATENT DOCUMENTS

| | | | |
|---|---|---|---|
| 4,683,195 A | 7/1987 | Mullis et al. | |
| 4,683,202 A | 7/1987 | Mullis | |
| 4,965,188 A | 10/1990 | Mullis et al. | |
| 6,432,360 B1 | 8/2002 | Church | |
| 6,485,944 B1 | 11/2002 | Church et al. | |
| 6,511,803 B1 | 1/2003 | Church et al. | |
| 7,425,431 B2 | 9/2008 | Church et al. | |
| 10,131,958 B1 | 11/2018 | Fan et al. | |
| 2006/0014167 A1* | 1/2006 | Church | C12Q 1/6846 435/6.12 |
| 2009/0018024 A1 | 1/2009 | Church et al. | |
| 2011/0013845 A1 | 1/2011 | Tu et al. | |
| 2012/0010091 A1* | 1/2012 | Linnarson | C12N 15/1065 506/7 |
| 2014/0357500 A1 | 12/2014 | Vigneault et al. | |
| 2016/0053253 A1 | 2/2016 | Salathia et al. | |
| 2017/0268056 A1 | 9/2017 | Vigneault et al. | |
| 2018/0002764 A1* | 1/2018 | Fan | C12Q 1/6874 |
| 2018/0163201 A1 | 6/2018 | Larson | |
| 2018/0208975 A1 | 7/2018 | Peterson et al. | |

FOREIGN PATENT DOCUMENTS

| | | |
|---|---|---|
| WO | 2005082098 A2 | 9/2005 |
| WO | 2006073504 A2 | 7/2006 |
| WO | 2010107416 A1 | 9/2010 |
| WO | 2015103339 A1 | 7/2015 |
| WO | 2017040306 A1 | 3/2017 |
| WO | 2017053905 A1 | 3/2017 |
| WO | 2018144813 A1 | 8/2018 |

OTHER PUBLICATIONS

Frohman et al. Proceedings of the National Academy of Sciences, USA 1988; 85: 8998-9002 (Year: 1988).*
Blanco et al., "Highly Efficient DNA Synthesis by the Phage o29 BNA Polymerase," The Journal of Biological Chemistry, 1989, vol. 264(15), pp. 8935-8940, Elsevier, Amsterdam, Netherlands.
International Preliminary Report on Patentability dated Jun. 17, 2021, issued in International Application No. PCT/US2019/064977.
International Search Report and Written Opinion of the International Searching Authority dated Mar. 9, 2020 in International Application No. PCT/US2019/064977.
Islam et al., "Characterization of the single-cell transcriptional landscape by highly multiplex RNA-seq," Genome Research, 2011, vol. 21, pp. 1160-1167, Cold Spring Harbor Laboratory Press, Cold Spring Harbor, New York.
Jaitin et al., "Massively parallel single cell RNA-Seq for marker-free decomposition of tissues into cell types," Science, 2014, vol. 343(6172), pp. 776-779, American Association for the Advancement of Science, Washington, DC.
Kivioja et al., "Counting absolute numbers of molecules using unique molecular identifiers," Nature Methods, 2012, vol. 9(1), pp. 72-76, Nature Portfolio, Berlin, Germany.
Kwok, "High-throughput genotyping assay approaches," Pharmacogenomics, 2000, vol. 1(1), pp. 1-5, Ashley Publications Ltd., London, United Kingdom.
Landegren et al., "Reading Bits of Genetic Information: Methods for Single-Nucleotide Polymorphism Analysis," Genome Research, 1998, vol. 8, pp. 769-776, Cold Spring Harbor Laboratory Press, Cold Spring Harbor, New York.
Notomi et al., "Loop-mediated isothermal amplification of DNA," Nucleic Acids Research, 2000, vol. 28(12), pp. i-vii, Oxford University Press, Oxford, United Kingdom.

(Continued)

*Primary Examiner* — Angela M. Bertagna
(74) *Attorney, Agent, or Firm* — Potomac Law Group, PLLC; Judith U. Kim

(57) ABSTRACT

The invention relates to methods for preparing cDNA samples for RNA sequencing using random priming oligonucleotides comprising a cell barcode (cID), a unique molecular index (UMI), and a random sequence region, and performing a reverse transcription reaction (RT). The invention also relates to cDNA samples prepared by the methods and uses thereof.

8 Claims, 15 Drawing Sheets
Specification includes a Sequence Listing.

(56) References Cited

OTHER PUBLICATIONS

Porreca et al., "Multiplex amplification of large sets of human exons," Nature Methods, 2007, vol. 4, pp. 931-936, Nature Portfolio, Berlin, Germany.

Shendure et al., "Accurate Multiplex Polony Sequencing of an Evolved Bacterial Genome," Science, 2005, vol. 309, pp. 1728-1732, American Association for the Advancement of Science, Washington, DC.

Shi, "Enabling Large-Scale Pharmacogenetic Studies by High-Throughput Mutation Detection and Genotyping Technologies," Clinical Chemistry, 2001, vol. 47(20), pp. 164-0172, Oxford University Press, Oxford, United Kingdom.

Xiong, et al., "A Comparison of mRNA Sequencing with Random Primed and 3'-Directed Libraries," Scientific Reports, Nov. 2017, vol. 7:14626, Nature Research, Springer Nature.

Zhu et al., "Reverse Transcriptase Template Switching: A Smart Approach for Full-Length cDNA Library Construction," BioTechniques, 2001, vol. 30(4), pp. 892-897, London, England.

Ziegenhain et al., "Comparative Analysis of Single-Cell RNA Sequencing Methods," Molecular Cell Article, 2017, vol. 65, pp. 631-673, Elsevier, Amsterdam, Netherlands.

Lizardi et al., "Mutation detection and single-molecule counting using isothermal rolling-circle amplification," Nature Genetics, 1998, vol. 19, pp. 225-232, Nature Portfolio, Berlin, Germany.

Wu et al., "The Ligation Amplification Reaction (LAR)—Amplification of Specific DNA Sequences Using Sequential Rounds of Template-Dependent Ligation," Genome, 1989, vol. 4(4), pp. 560-569, Elsevier, Amsterdam, Netherlands.

Fan et al., Single-cell RNA-seq transcriptome analysis of linear and circular RNAs in mouse preimplantation embryos, Genome Biology, vol. 16, No. 1, 2015.

Islam et al., Highly multiplexed and strand-specific single-cell RNA 5' end sequencing, Nature Protocols, vol. 7, No. 5., 2012.

The extended European Search Report completed Aug. 3, 2022 for European Application No. 19893636.1.

\* cited by examiner 4-6 HT1080 cells in RT

| | 3' UPX | "TdT" v2 | "Decoupled TS" v2 |
|---|---|---|---|
| Total UMI | 156558 | | |
| Read per UMI | 2.18 | 2.51 | 1.18 |
| Genes (UMI>0) | 10793 | | | single HT1080 cell in RT, 8 cells pooling

| | 3' UPX | "TdT" v2 | "Decoupled TS" v2 |
|---|---|---|---|
| Total UMI | 52147 | | |
| Read per UMI | 4.87 | 1.54 | 1.19 |
| Genes (UMI>0) | 6576 | | |

FIG. 14

METHODS FOR PREPARING CDNA SAMPLES FOR RNA SEQUENCING, AND CDNA SAMPLES AND USES THEREOF

REFERENCE TO SEQUENCE LISTING SUBMITTED ELECTRONICALLY

The content of the electronically submitted sequence listing in ASCII file (Name: 2495-0003US01 SEQL ST25; Size: 24,576 bytes; and Date of Creation: Mar. 18, 2025) filed with the application is incorporated herein by reference in its entirety.

BACKGROUND OF THE INVENTION

Figure 1A:
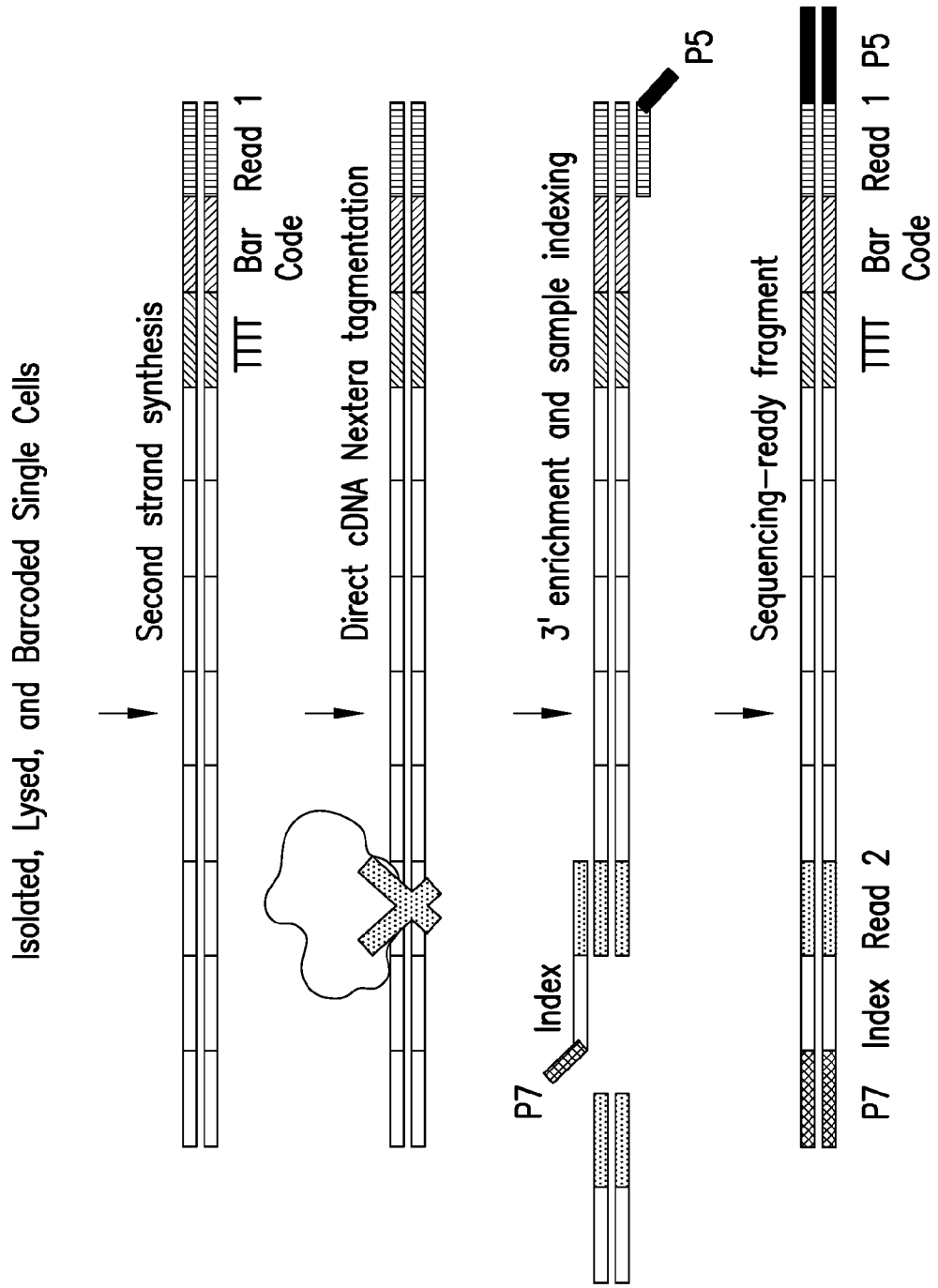
Figure 1B:
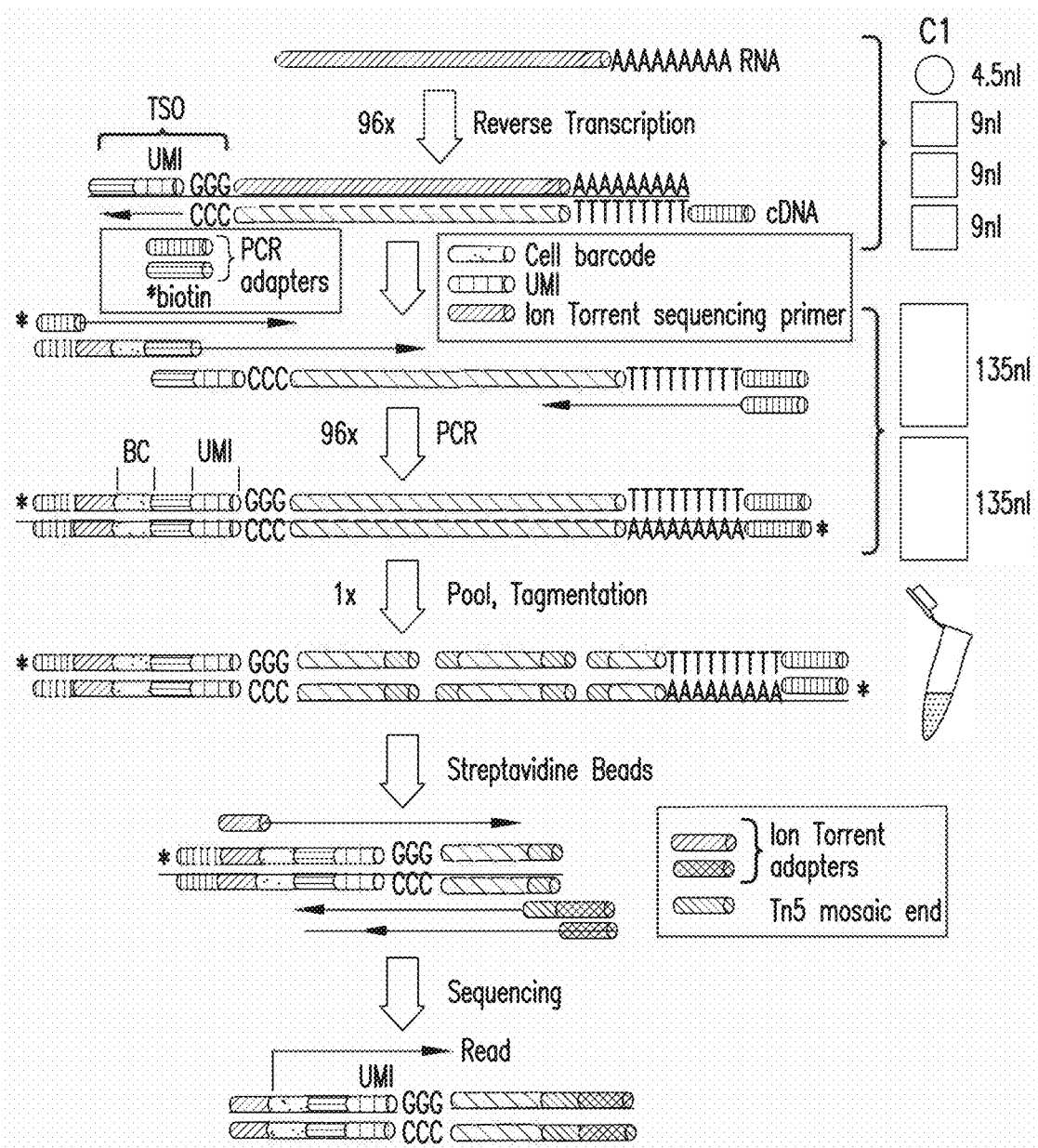

Single cell RNA sequencing is a powerful technology to reveal cell-to-cell heterogeneity within a tissue or complex biological sample, e.g., blood. Each cell has to be sequenced, which has been tedious and expensive. This historically limited the number of cells one can analyze. In order to increase the throughput and reduce the cost per cell in RNA sequencing, unique cell specific barcodes have been used in recent years. All RNA from a single cell are labeled with a unique barcode and RNA from different cells will have different barcodes. Currently, all reported methods have used the cell specific barcode in either a 3' bias or 5' bias fashion. Typically, a 3' cell barcode is added through a poly(T) priming during the reverse transcription (RT) step (Jaitin, Diego Adhemar et al., *Science* 343:776 (2014)). An example is shown in FIG. 1A. Typically, a 5' cell barcode is added through a template switching oligo (TSO) during the RT template switching process (Islam, Saiful et al., *Genome Research* 21:1160-1167 (2011)). An example is shown in FIG. 1B. After the cell barcodes are attached, cDNAs from many cells can be pooled together in one library preparation step and used in one sequencing run. During sequencing, the cell barcode and adjacent gene specific sequence will be read together for each library fragment. Thus, the RNA reads can be linked to specific cell barcodes and cells.

Figure 2:
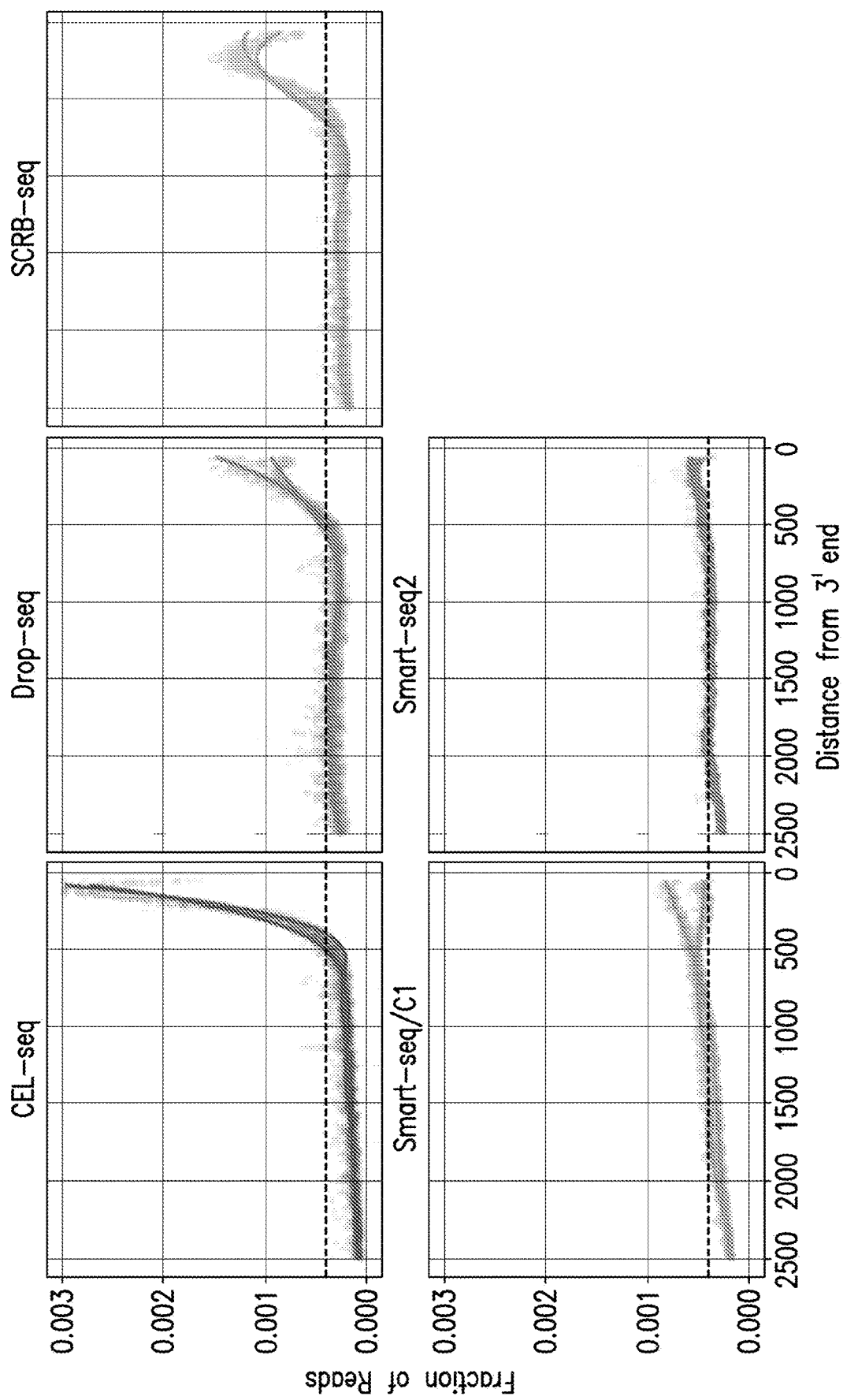

Compared to traditional single cell RNA sequencing method such as SMART-seq, the cell barcoding and pooling greatly reduced the individual library preparation efforts. U.S. Pat. No. 10,131,958 and US Pub. No. 2016/00532563. However, due to the short read limitation of existing next-generation sequencing (NGS) technology, only a short RNA sequence adjacent to the cell barcode is sequenced. Most RNAs are long, averaging to about 1.5 kb. When the cell barcode is attached to cDNA at either the 5' end or 3' end, current single cell barcoding RNA sequencing has severe 5' and 3' coverage bias. Traditional single cell RNA sequencing method, such as SMART-seq, does not have this bias (Ziegenhain, Christoph et al., *Molec. Cell* 65:631-643.e4 (2017)) (FIG. 2). However, due to lack of single cell specific barcoding, each cell specific NGS library has to be prepared separately.

Having full-length RNA coverage is important in many applications, such as splicing isoform and allele specific expression analyses. There is a need for new technology that can provide single cell specific barcoding and full-length sequencing coverage at the same time.

BRIEF SUMMARY OF THE INVENTION

Disclosed herein are methods of generating a cDNA sample, comprising adding to an RNA sample, a plurality of random priming oligonucleotides, each random priming oligonucleotide comprising a cell barcode (cID), a unique molecular index (UMI), and a random sequence region of 5 to 8 nucleotides, and performing a reverse transcription reaction (RT). In some embodiments, the random priming oligonucleotide further comprises a universal amplification sequence. In some embodiments, two or more of the random priming oligonucleotides bind to a single RNA molecule. The methods can further comprise performing an amplification reaction to generate a cDNA sample.

The methods disclosed herein can further comprise adding a template switching oligonucleotide (TSO) and performing a template switching reaction (TS) to generate a cDNA sample comprising universal PCR handles on the 5' and 3' ends. In some embodiments, the TS is coupled to the RT or the TS is decoupled from the RT. In some embodiments, the TS is cap dependent. In some embodiments, the TS is cap independent.

The methods can further comprise adding a homopolymer oligonucleotide tail to a first strand cDNA by adding a terminal transferase (TdT) and performing a primer extension reaction to generate a second strand cDNA comprising universal PCR handles on the 5' and 3' ends. The homopolymer oligonucleotide tail can comprise adenines (A), cytosines (C guanines (G), or thymines (T).

The random sequence region can comprise random nucleotides selected from A, C, G, and T bases (N5-8). The random sequence region can comprise random nucleotides selected from A, C, and T bases (H5-8). The random sequence region can comprise 5 to 8 random nucleotides selected from A, C, G, and T bases and 3 G bases (N5-8G3). The random sequence region can comprise 5 random nucleotides selected from A, C, G, and T bases and 3 G bases (N5G3) in a 5' to 3' direction. The random sequence region can comprise 5 to 8 random nucleotides selected from A, C, G, and T bases and 3 T bases (N5-8T3). The random sequence region can comprise 5 random nucleotides selected from A, C, G, and T bases and 3 T bases (N5T3) in a 5' to 3' direction.

The methods disclosed herein can further comprise sequencing the cDNA sample.

Also disclosed herein are random priming oligonucleotides comprising a random sequence region of 5 to 8 nucleotides, a unique molecular index (UMI), and a cell barcode (cID), mixtures of at least 2 of the random priming oligonucleotides disclosed herein, and kits containing one or more of the random priming oligonucleotides or mixtures thereof.

BRIEF DESCRIPTION OF THE DRAWINGS/FIGURES

FIG. 1A. Overview of SureCell WTA 3' Library Prep Kit for the ddSEQ System.

FIG. 1B. Overview of reverse transcription template switching process.

FIG. 2. Data on 5' and 3' end bias.

Figure 3:
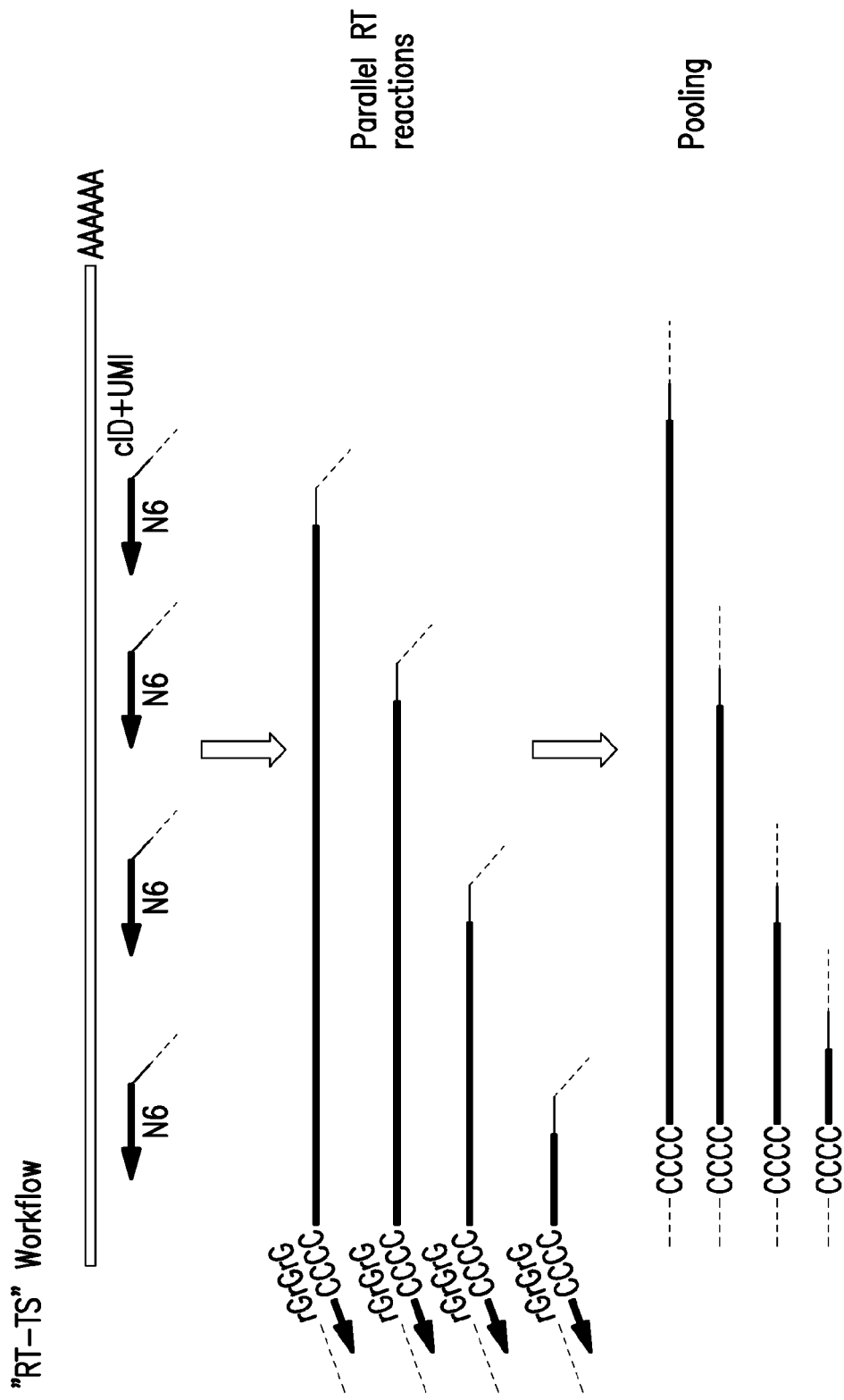

FIG. 3. RT-TS workflow.

Figure 4:
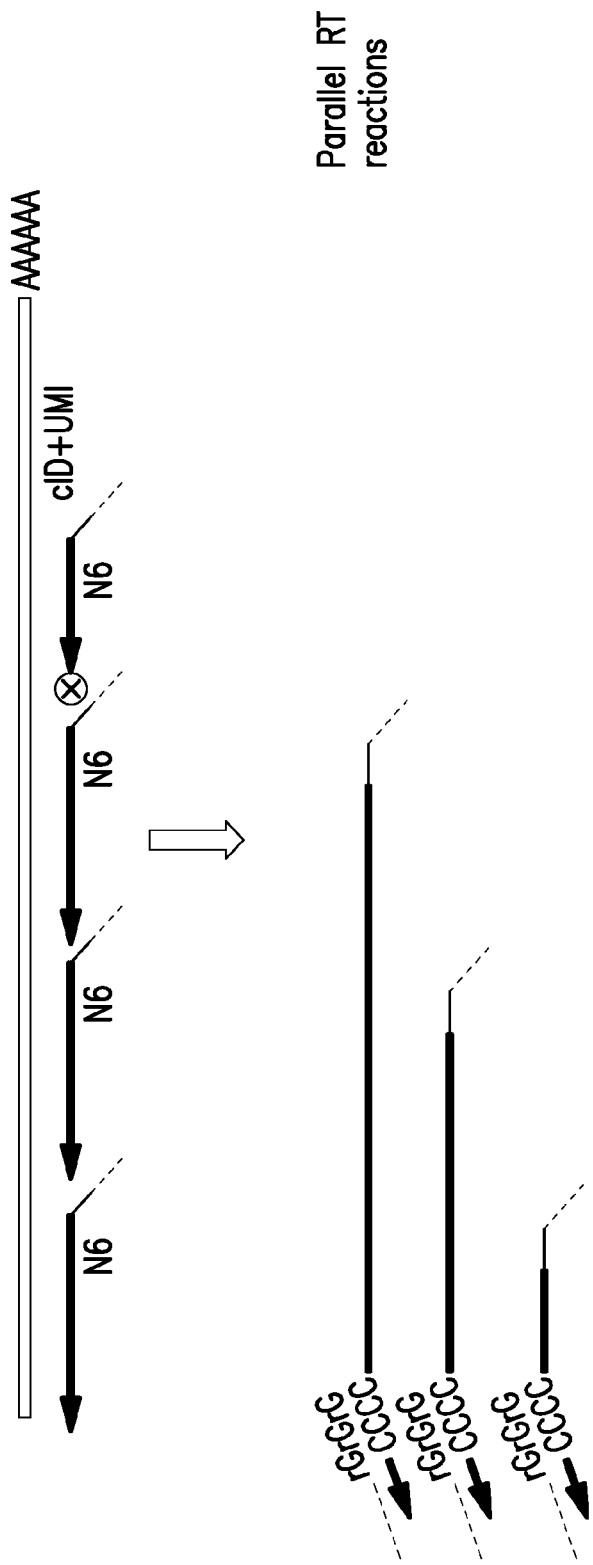

FIG. 4. RT-TS workflow showing potential cDNA extension blockage.

Figure 5:
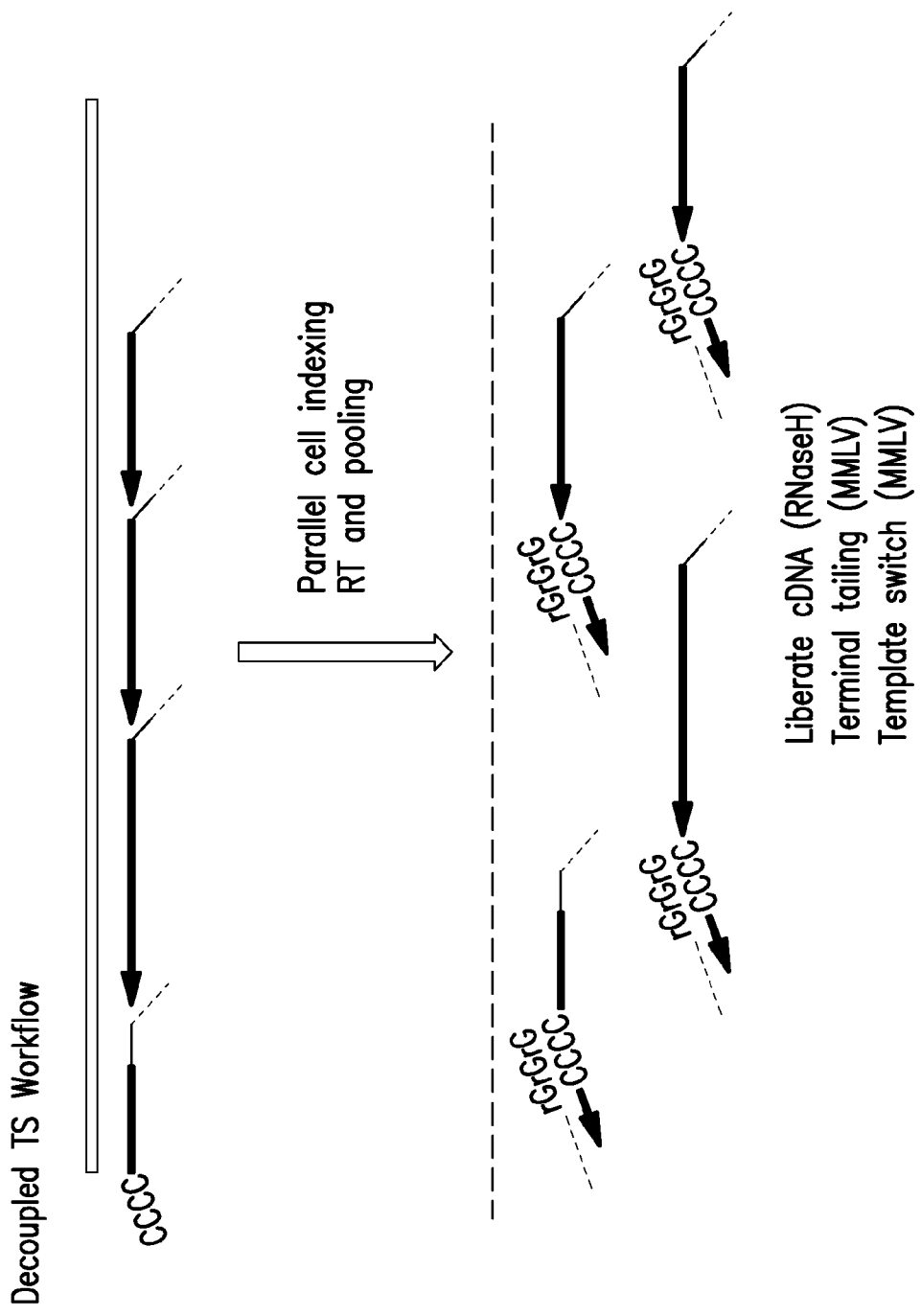

FIG. 5. Decoupled TS workflow.

Figure 6:
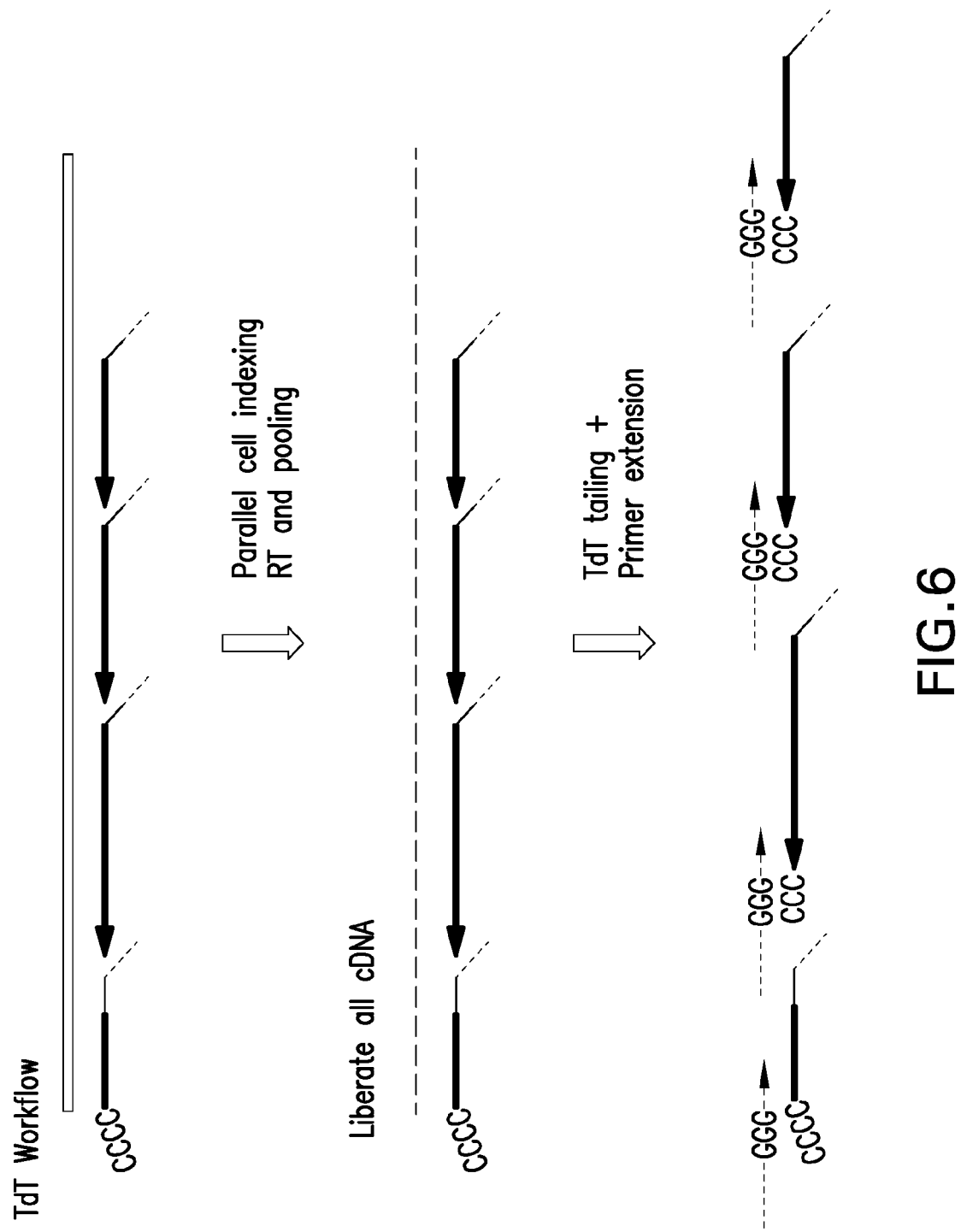

FIG. 6. TdT workflow.

Figure 7:
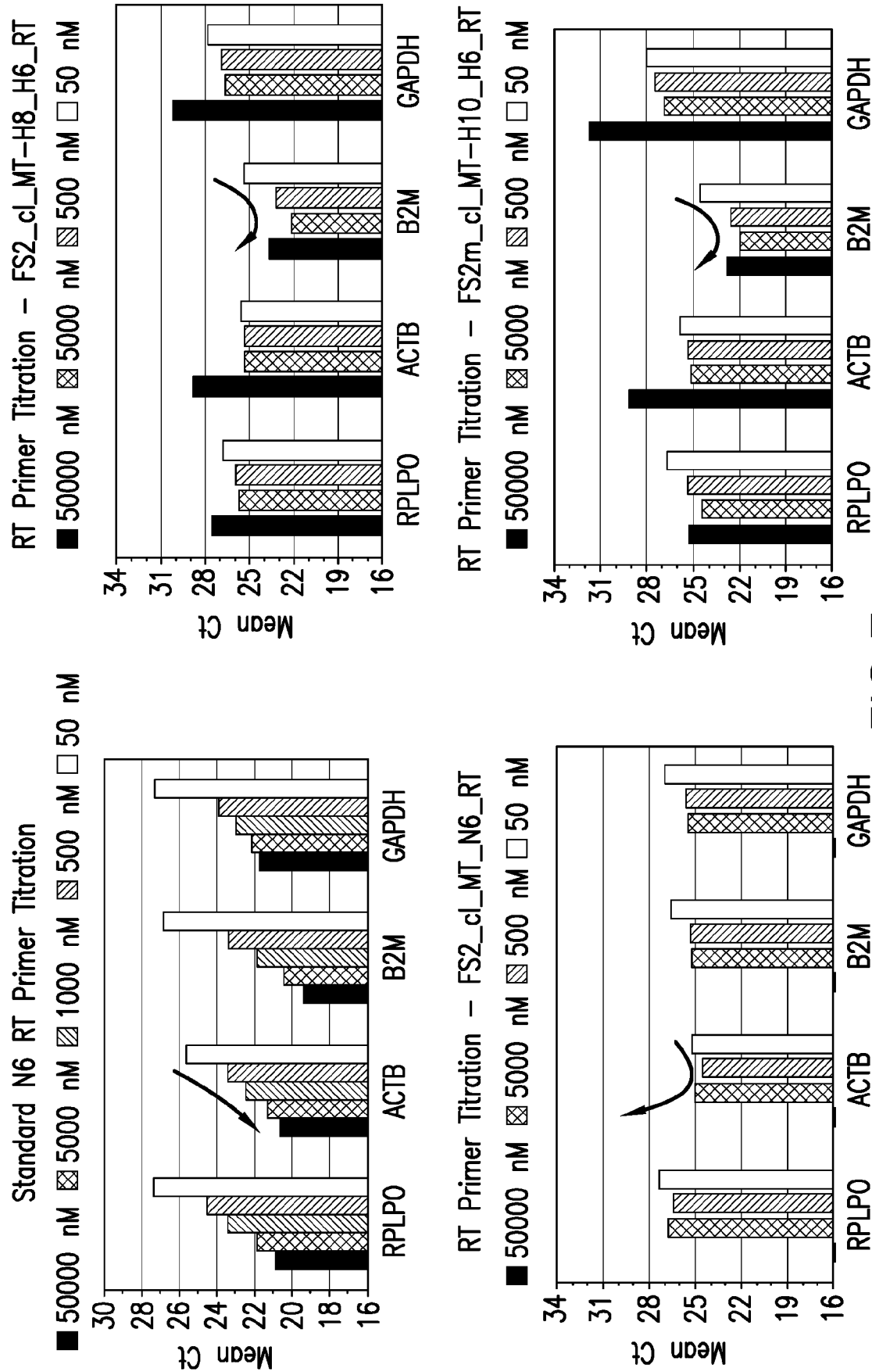

FIG. 7. Data on RT primer titration and effects of different random primer structures.

Figure 8:
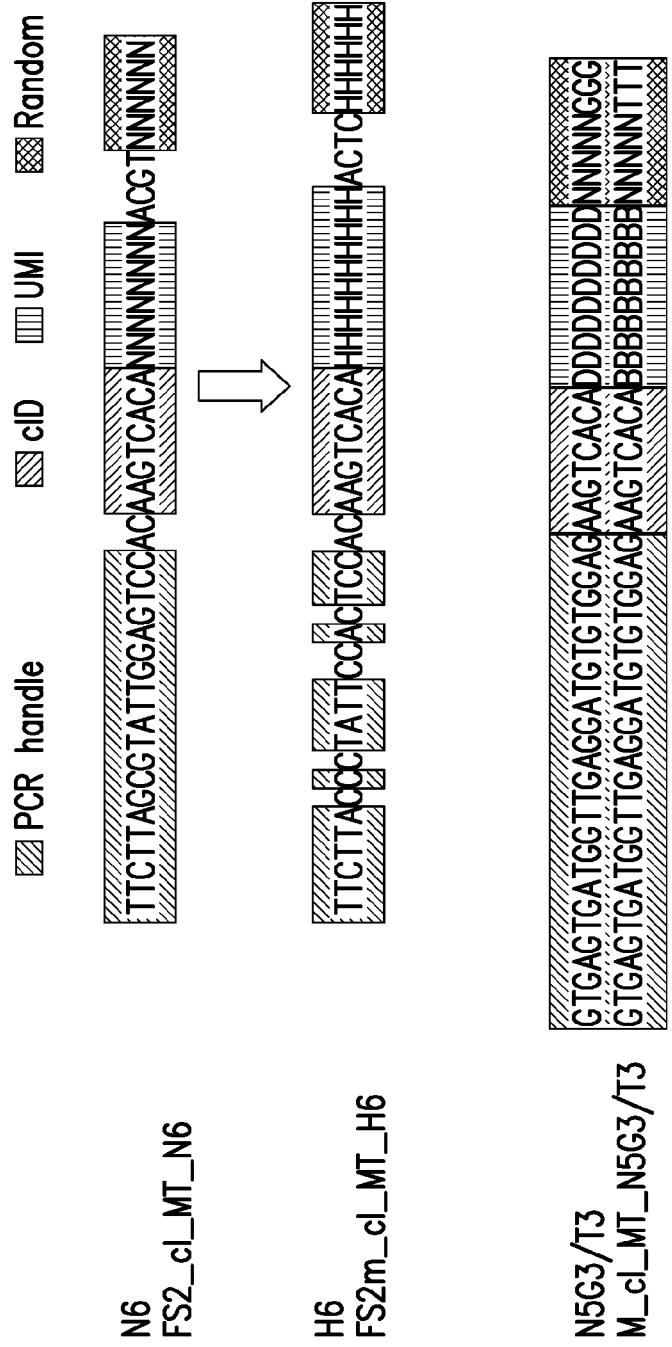

FIG. 8. Example random priming oligonucleotides containing PCR handle, cID, UMI and random sequence region. N6, FS2_cl MT N6 is SEQ ID NO:2. H6; FS2m_cl MT H6 is SEQ ID NO: 68; and N5G3/T3, M_cl MT N5G3/T3 upper and lower sequences are SEQ ID NOS: 63 and 64, respectively.

Figure 9:
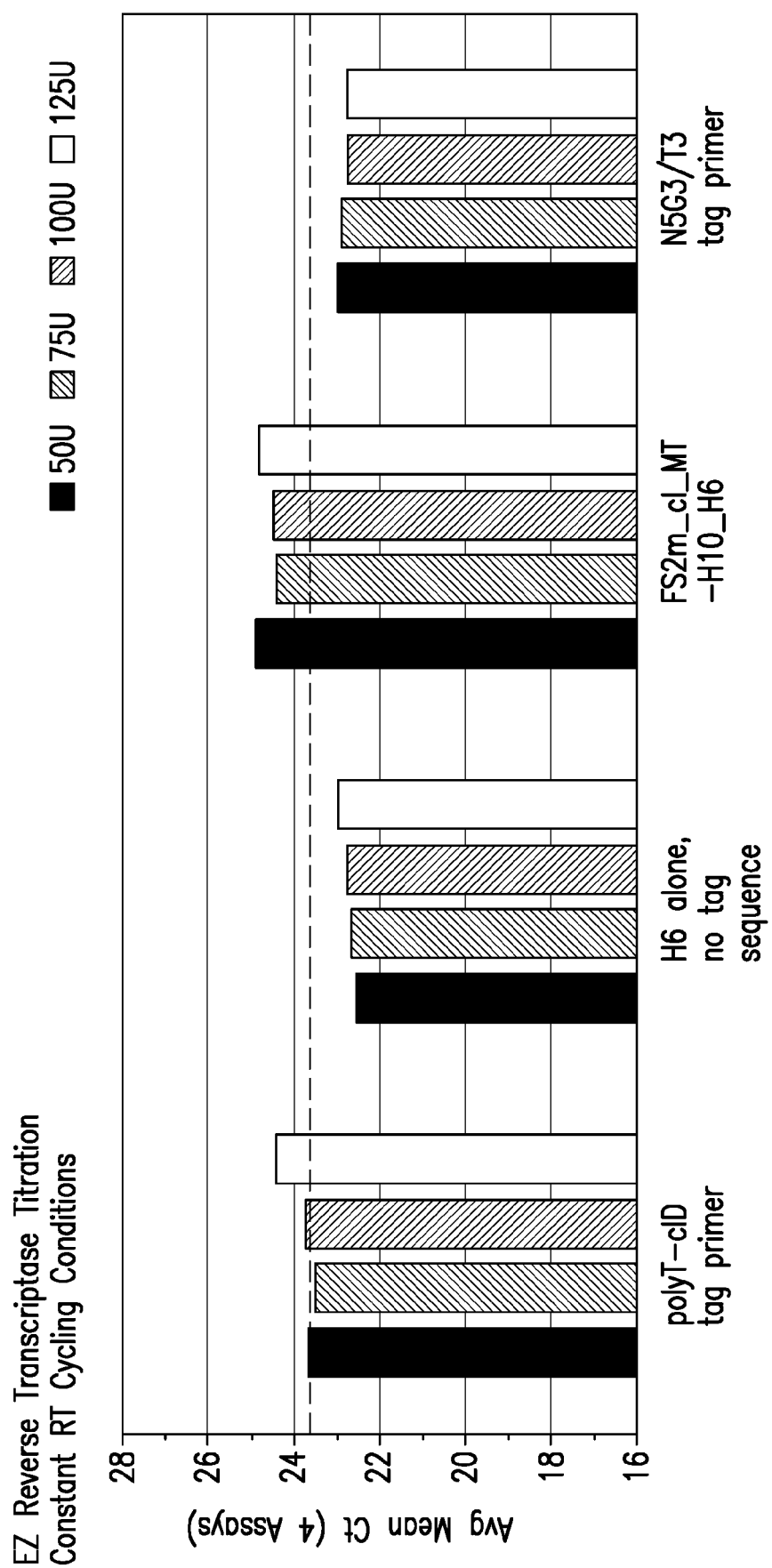

FIG. 9. Efficiency of random sequence regions as measured by gene specific RT-qPCR.

Figure 10:
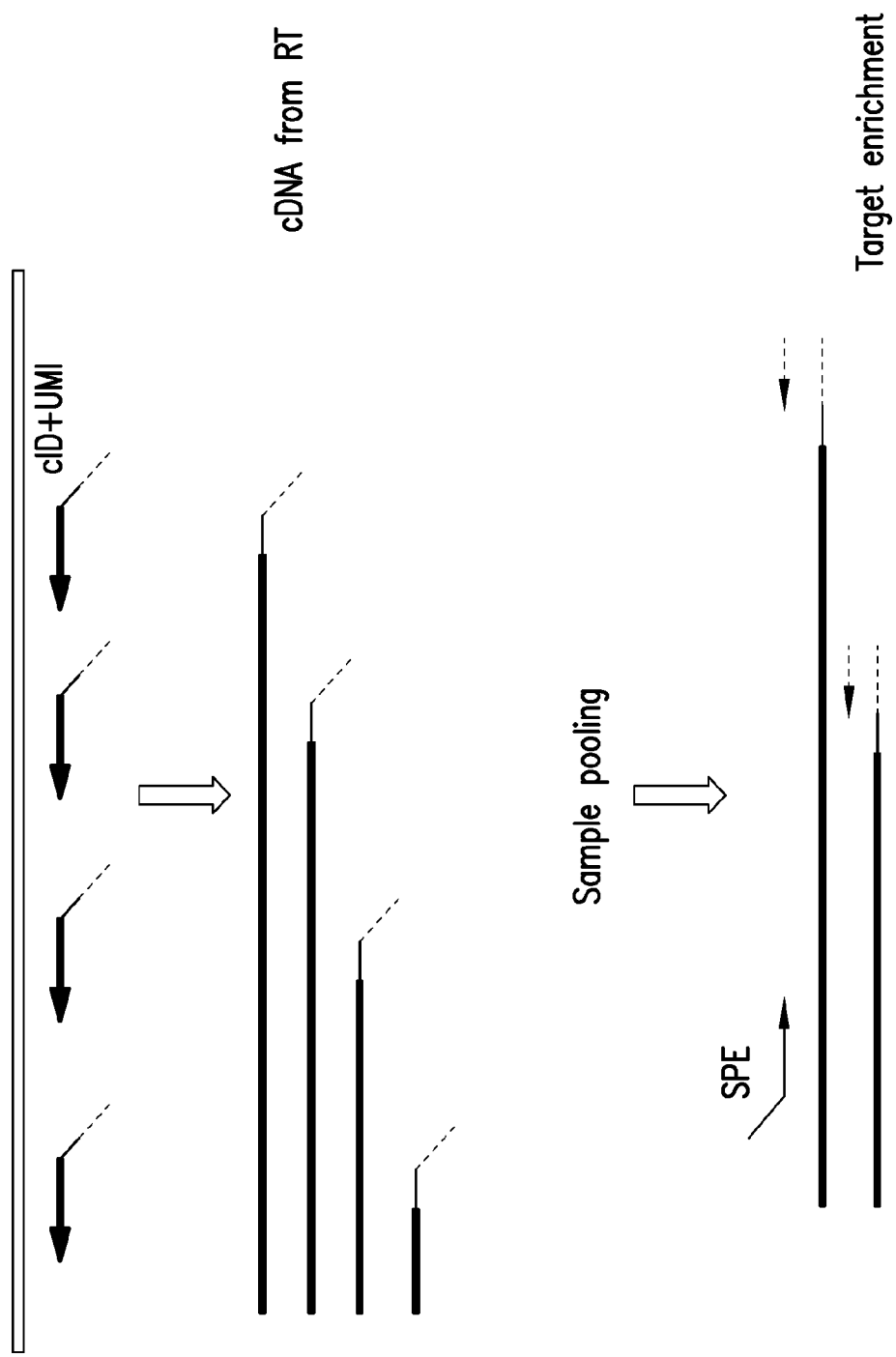

FIG. 10. Workflow combining random RT and targeted enrichment reactions.

Figure 11:
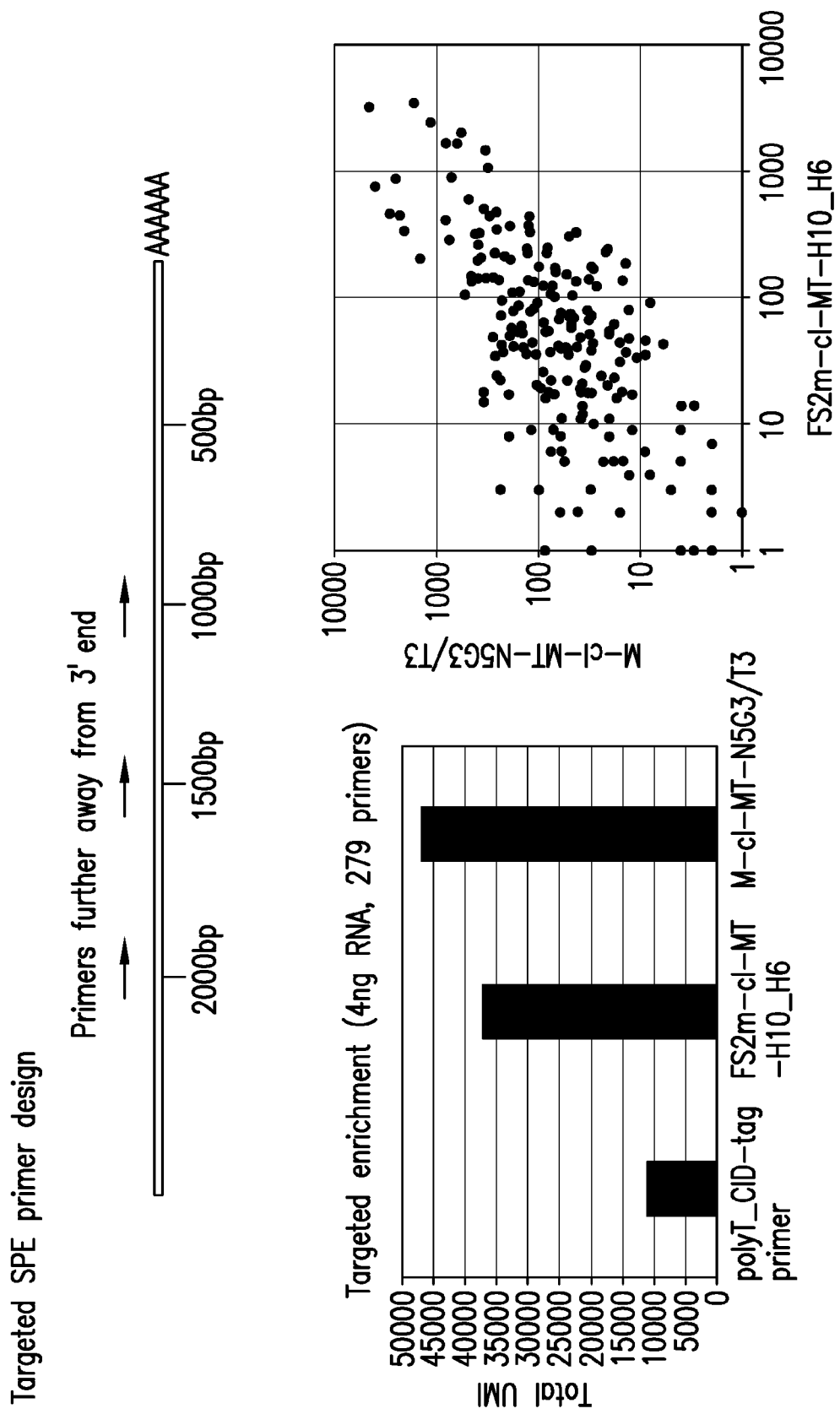

FIG. 11. Design of gene specific single primers with increasing distance from the RNA 3' end and data from targeted enrichment sequencing.

Figure 12:
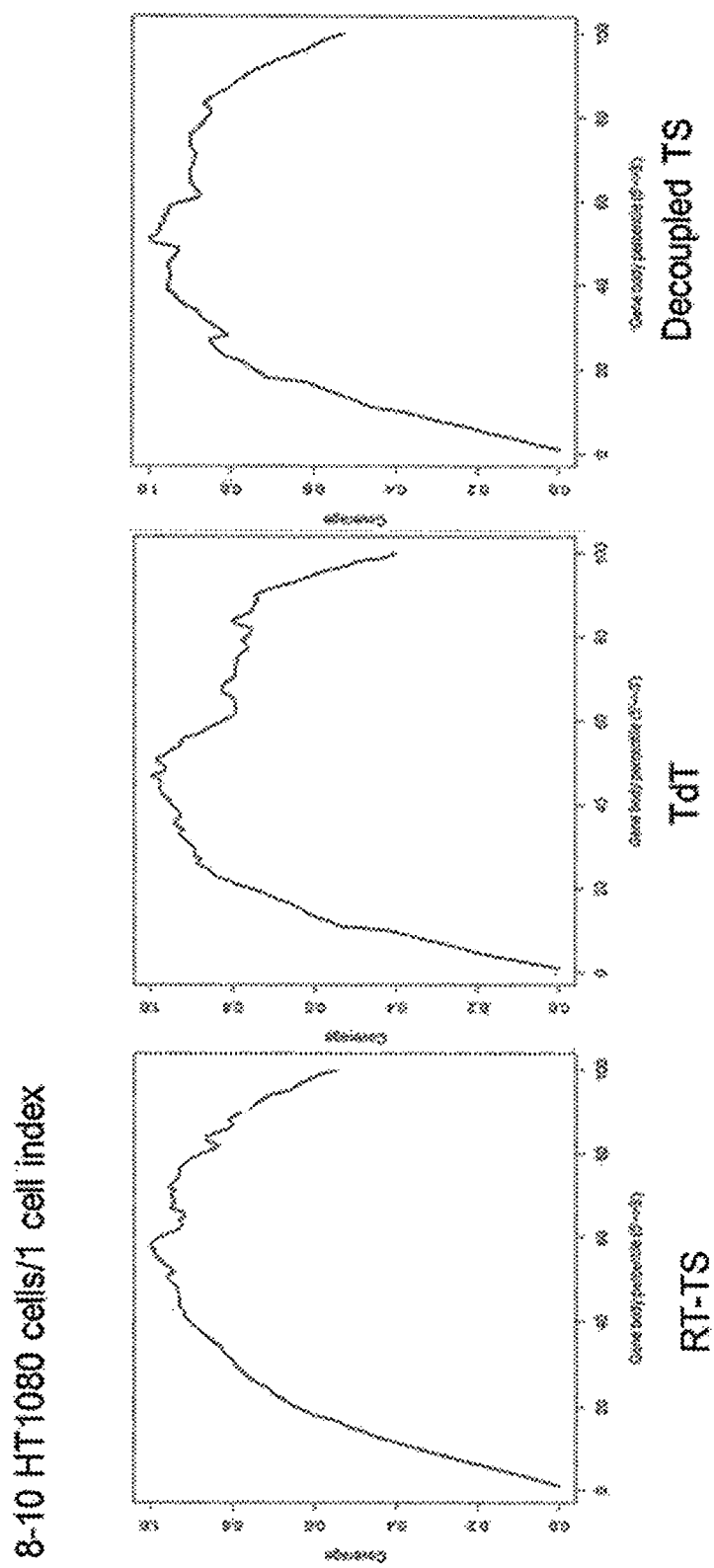

FIG. 12. Comparison of RT-TS, TdT, and decoupled TS workflows.

Figure 13:
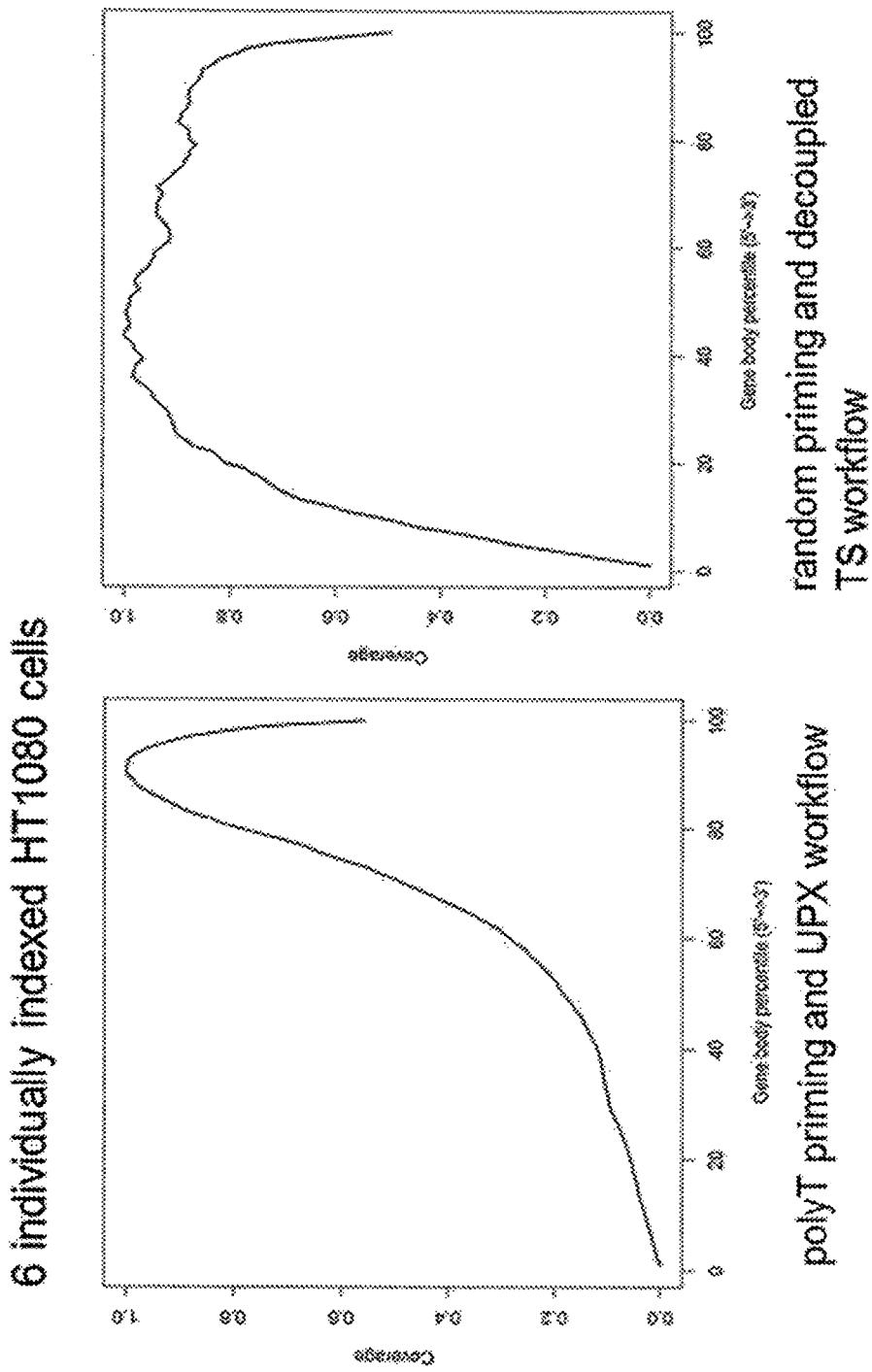

FIG. 13. With polyT primers, the QIAseq UPX workflow was performed. With random priming oligonucleotides, decoupled TS workflow was performed. Random priming oligonucleotides and decoupled TS workflow show more uniform 5' and 3' end gene coverage than polyT primers.

FIG. 14. Substantially more cDNA UMIs sequenced from two improved non-bias workflows over 3' bias workflow. Amplified cDNAs were made into NGS libraries and sequenced on MiSeq, and results provided.

DETAILED DESCRIPTION OF THE INVENTION

Disclosed herein are systems that provide high throughput methods to process many samples or single cells for targeted and whole transcriptome RNA sequencing. Different from existing high throughput single cell RNA sequencing methods that have either a 3' or 5' end bias, this approach can provide uniform sequence coverage from the 5' end to 3' end. The uniform coverage is achieved by using oligonucleotides comprising specially designed random sequence regions and a sequence tag comprising a cell barcode, and UMI, optionally, including universal PCR sequence. Faced with the challenge of generally low cDNA synthesis efficiency using random oligos with long sequence tags, the randomer disclosed herein reduces primer dimer potential, resulting in higher RT efficiency. In addition to traditional RT-template switching chemistry, e.g., two alternative workflows are provided to more efficiently add a second primer handle and form complete PCR amplicons.

Thus, disclosed herein are methods of generating a cDNA sample, comprising adding to an RNA sample, a plurality of random priming oligonucleotides, each random priming oligonucleotide comprising a cell barcode (cID), a unique molecular index (UMI), and a random sequence region of 5 to 8 nucleotides, and performing a reverse transcription reaction (RT). In some embodiments, one, two or more, or all of the random priming oligonucleotide further comprises a universal amplification sequence. In some embodiments, two or more, three or more, four or more of the random priming oligonucleotides bind to a single RNA molecule. Further, an amplification reaction can be performed to generate a cDNA sample.

In some embodiments, the methods disclosed herein further comprise adding a template switching oligonucleotide (TSO) and performing a template switching reaction (TS) to generate a cDNA sample comprising universal PCR handles on the 5' and 3' ends. The TS can occur during the RT (coupled to RT) or be decoupled from the RT. For example, when TSO is provided during RT, TS can occur during cDNA synthesis. Alternatively, TS process and RT process can be decoupled, e.g., when TSO is absent during RT, but is provided in a separate step after cDNA has been synthesized by RT.

The TS can be cap dependent or cap independent. Full length mRNA has a 5'-end cap, a 7-methylguanylate ($m^7G$) connected to mRNA via an unusual 5' to 5' triphosphate linkage. Cap dependent TS refers to TS occurring when cDNA synthesis reaches the 5'-end cap structure of RNA template. TS can also occur when cDNA synthesis reaches RNA 5'-end without the cap structure (e.g., prokaryotic RNA or fragmented RNA), or on standalone cDNA not duplexed with RNA. Cap dependent TS is generally more efficient than cap independent TS.

In some embodiments, the methods can further comprise adding a homopolymer oligonucleotide tail to a first strand cDNA by adding a terminal transferase (TdT) and performing a primer extension reaction to generate a second strand cDNA comprising universal PCR handles on the 5' and 3' ends. The homopolymer oligonucleotide tail can comprise adenines (A), cytosines (C), guanines (Ci) or thymines (T).

The methods disclosed herein reduces the 5' and/or 3' end bias while incorporating UMI and cell barcode, e.g., in RNA sequencing such as single cell or high throughput single cell RNA sequencing. Thus, methods allow sequencing of the full-length of the RNA molecules with UMI and cell barcode.

In order to label cell specific barcodes beyond the 3' end or 5' end of the RNA, random priming oligonucleotides with cell barcodes can be used during the first strand cDNA synthesis. One example workflow diagram is shown in FIG. 3. In this example, a random priming oligonucleotide contains, from 3' to 5', a random sequence region of 6 nucleotides (N6), unique molecular index (UMI), a cell barcode (cID), and a universal PCR sequence. Through the random N6 sequence, the random priming oligonucleotide primes cDNA synthesis in multiple locations throughout the full-length of an RNA molecule, so that RT does not have a 5' or 3' end bias. Also shown in FIG. 3, another universal sequence (for later PCR amplification) can be added through template switching mechanisms in the same reverse transcription reaction. The resulting cDNA from different sample reactions can be pooled immediately after cDNA synthesis.

Another benefit of random priming, i.e., non-specific binding, is that the target RNA is not restricted to polyadenylated RNA species, e.g., mRNA. Many non-coding RNAs do not have polyadenylation and are important for biological functions.

Because of the multiple priming events along each of the RNA molecules, one newly formed cDNA can hinder the extension of another upstream cDNA. Although most reverse transcriptase have strand displacement activity, there is a chance that some cDNA extension is blocked and cannot form a complete PCR amplicon (FIG. 4). In some cases, the amplicon formed can be too long, due to the random priming near 3' end, and the resulting long amplicon cannot be sequenced efficiently.

In such a situation, the cDNA can be released from the RNA-DNA duplex before template switching reaction. For example, the template switching reaction can be decoupled from the reverse transcription reaction (FIG. 5). Because not all cDNA reached the RNA 5' cap structure, template switching can be achieved through cap dependent or cap independent mechanism of the RT enzymes. Generally, cap dependent template switching is more efficient than the cap independent mechanism.

To ensure that all cDNA can form valid PCR amplicons, another approach can be used. Terminal transferase (TdT) has a much higher terminal tailing activity than RT enzymes. TdT can be used to add poly nucleotide tails and then a second strand primer partially complementary to the tail sequence can be used to generate second strand cDNA containing universal PCR handles on both ends (FIG. 6). Although C tailing is shown in FIG. 6, G tailing, T tailing, or A tailing can also be used.

The design of the random sequence region in the random priming oligonucleotide is important. A typical randomer with a long '5 tag sequence (e.g., containing a cell barcode, UMI, and universal PCR tag) are prone to forming primer dimers, which will reduce the effective concentration of free oligos to prime RNA. Such long random priming oligos will be less efficient in cDNA synthesis compared to an N6 mer alone or poly T primers (FIG. 7). Additional random UMI sequences in the oligo will further exacerbate the problem. Inhibitory effects can be seen when too much of a long random oligo is used, but not with short N6 mers. A H6 randomer (A, C, and T bases without G bases) will be less likely to form dimers than a N6 randomer due to lack of CG pairings.

To further reduce the dimer potential of long random oligo structures, the base composition of the random sequence region can be changed, e.g., from N6 to H6 to N5G3/N5T3. N5G3/N5T3 oligos are a mixture of two separately synthesized N5G3 and N5T3 oligos (FIG. 8).

By restricting but not completely eliminating the randomness of the primer end (3' end), significant improvement in cDNA synthesis efficiency (as measured by gene specific RT-qPCR assays) and more tolerance to higher oligo concentrations (FIGS. 7 and 9) can be observed.

To evaluate the effects of a random priming oligo vs. traditional poly T based oligo on RNA sequence coverage, gene specific single primers with increasing distance from the RNA 3' end have been designed (FIG. 10). cDNA can be generated using various UMIs containing RT primers with anchored poly T sequence end, random H6 end, or random N5G3/T3 ends. Using a simple targeted enrichment reaction (FIG. 11), where no template switching or addition of second PCR handle is needed, a loci can be enriched and sequenced further away from RNA 3' end. After sequencing, the number of UMIs from different cDNA synthesis conditions can be counted. Both H6 and N5G3/T3 based RT oligos can generate much higher number of UMIs than poly T based RT oligos, suggesting better sequence coverage for regions further away from the 3' end of the RNA. The UMI counts also correlate between cDNA generated by two different random primers (FIG. 11).

Disclosed herein are "random priming oligonucleotides" comprising a random sequence region of 5 to 8 nucleotides, a unique molecular index (UMI), and a cell barcode (cID). In some embodiments, one, two or more, or all of the random priming oligonucleotide further comprises a universal amplification sequence. The "random sequence region" can comprises 5, 6, 7, or 8 random nucleotides selected from A, C, G, and T bases (N5, N6, N7, or N8, respectively). In some embodiments, the random sequence region can comprise 5, 6, 7, or 8 random nucleotides selected from A, C, and T bases (H5, H6, H7, or H8, respectively, without G bases). In some embodiments, the random sequence region can comprise 5 to 8 random nucleotides selected from A, C, G, and T followed by 3 G bases (N5-8G3). In some embodiments, the random sequence region can comprise 5 random nucleotides selected from A, C, G, and T and 3 G bases (N5G3) in a 5' to 3' direction. In other embodiments, the random sequence region can comprise 5 to 8 random nucleotides selected from A, C, G, and T bases followed by 3 T bases (N5-8T3 In further embodiments, the random sequence region can comprise 5 random nucleotides selected from A, C, G, and T and 3 T bases (N5T3) in a 5' to 3' direction. In some embodiments, the random sequence regions described herein can be at the 3' end of the random priming oligonucleotides.

Also disclosed herein are mixtures of at least 2 of the random priming oligonucleotides containing a random sequence region as described above.

The random priming oligonucleotides and mixtures thereof described above can be used in the various methods disclosed herein.

The random sequence region disclosed herein provides nonspecific binding of the random priming oligonucleotides to a single RNA molecule at one, two, three, four, or more multiple locations, independent of the specific sequence of the target RNA while reducing the possibility of forming a dimer, trimer, etc. between two or more random priming oligonucleotides. The random sequence region is not 9 nucleotides or more.

Using the "RT-TS" workflow, e.g., the full-length coverage of both polyadenylated and non-polyadenylated RNA can be performed.

"RT-TS", "Decoupled TS", "TdT" workflows, e.g., can be performed using one or multiple cells, such as but not limited to 2-1000, 5-1000, 10-1000, 50-1000, 100-1000, 500-1000 cells, in each RT reaction. For example, the same rGrGrG ending template switching oligo can be used for "RT-TS" and "Decoupled TS" workflow, while the GGG ending second strand primer can be used in "TdT" workflow. The results show that UMI and cell barcodes are uniformly distributed throughout the gene body without significant 5' or 3' bias (FIG. 12).

Individual cells with different cell barcodes can be indexed using either a random priming oligonucleotide or polyT primer. Thus, multiple cells, e.g., 6 cells, can be pooled together after an RT reaction and whole transcriptome libraries can be made. With polyT primers, the QIAseq UPX workflow can be followed. With random priming oligonucleotides, "decoupled TS" workflow can be followed. The random priming oligonucleotides and "decoupled TS" workflow provides much more uniform 5'-3' end gene coverage than polyT primers (FIG. 13).

Different workflows and different designs of a second strand primer can have a big impact on the total number of UMIs recovered after sequencing. Having more UMIs after sequencing indicates overall higher reaction efficacy, and can lead to higher RNA detection sensitivity, which is especially important for low expression transcripts. Using second strand primers ending in a random sequence region as described herein, e.g., N5G3, in the "TdT" (C tailing) workflow or template switching oligo ending in a random sequence region as described herein, e.g., N5G3, can yield much higher UMIs and more gene detection than other alternative configurations.

The methods disclosed herein can be performed with or without physical separation of DNA and RNA from the sample. In some embodiments, the methods can include ribosomal depletion. Alternatively, in some embodiments, the methods do not require ribosomal depletion. Methods for ribosomal depletion are known in the art, e.g., using RiboZero gold (Illumina: MRZG126).

The term "sample" can include RNA, DNA, a single cell, multiple cells, fragments of cells, and/or an aliquot of body fluid, taken from a subject (e.g., a mammalian subject, an animal subject, a human subject, or a non-human animal subject). An "RNA sample" contains RNA and can include or not include these other types of samples. Samples can be selected by one of skill in the art using any known means known including but not limited to centrifugation, venipuncture, blood draw, excretion, swabbing, biopsy, needle aspirate, lavage sample, scraping, surgical incision, laser capture microdissection, gradient separation, or intervention or other means known in the art. The term "mammal" or "mammalian" as used herein includes both humans and non-humans and include but is not limited to humans, non-human primates, canines, felines, murines, bovines, equines, and porcines.

As used herein, the term "biological sample" is intended to include, but is not limited to, tissues, cells, biological fluids and isolates thereof, isolated from a subject, as well as tissues, cells, and fluids present within a subject.

As used herein, a "single cell" refers to one cell. Single cells useful in the methods described herein can be obtained from a tissue of interest, or from a biopsy, blood sample, or cell culture. Additionally, cells from specific organs, tissues, tumors, neoplasms, or the like can be obtained and used in the methods described herein. In general, cells from any population can be used in the methods, such as a population of prokaryotic or eukaryotic organisms, including bacteria or yeast.

A single cell suspension can be obtained using standard methods known in the art including, for example, enzymatically using trypsin or papain to digest proteins connecting cells in tissue samples or releasing adherent cells in culture, or mechanically separating cells in a sample. Samples can also be selected by one of skill in the art using one or more markers known to be associated with a sample of interest.

Methods for manipulating single cells are known in the art and include fluorescence activated cell sorting (FACS), micromanipulation and the use of semi-automated cell pickers (e.g., the Quixell™ cell transfer system from Stoelting Co.). Individual cells can, for example, be individually selected based on features detectable by microscopic observation, such as location, morphology, or reporter gene expression.

Once a desired sample has been identified, the sample is prepared and the cell(s) are lysed to release cellular contents including DNA and RNA, such as gDNA and mRNA, using methods known to those of skill in the art. Lysis can be achieved by, for example, heating the cells, or by the use of detergents or other chemical methods, or by a combination of these. Any suitable lysis method known in the art can be used.

Nucleic acids from a cell such as DNA or RNA are isolated using methods known to those of skill in the art.

The term "oligonucleotide(s)" or "polynucleotide(s)" refers to nucleic acids such as DNA molecules and RNA molecules and analogs thereof (e.g., DNA or RNA generated using nucleotide analogs or using nucleic acid chemistry). As desired, the oligonucleotides can be made synthetically, e.g., using art-recognized nucleic acid chemistry or enzymatically using, e.g., a polymerase, and, if desired, can be modified. Typical modifications include methylation, biotinylation, and other art-known modifications. In addition, a polynucleotide can be single-stranded or double-stranded and, where desired, linked to a detectable moiety. In some aspects, a polynucleotide can include hybrid molecules, e.g., comprising DNA and RNA.

"G," "C," "A," "T" and "U" each generally stands for a nucleotide that contains guanine, cytosine, adenine, thymidine and uracil as a base, respectively. However, it will be understood that the term "ribonucleotide" or "nucleotide" can also refer to a modified nucleotide or a surrogate replacement moiety. The skilled person is well aware that guanine, cytosine, adenine, and uracil can be replaced by other moieties without substantially altering the base pairing properties of an oligonucleotide comprising a nucleotide bearing such replacement moiety. For example, without limitation, a nucleotide comprising inosine as its base can base pair with nucleotides containing adenine, cytosine, or uracil. Hence, nucleotides containing uracil, guanine, or adenine can be replaced in nucleotide sequences by a nucleotide containing, for example, inosine. In another example, adenine and cytosine anywhere in the oligonucleotide can be replaced with guanine and uracil, respectively, to form G-U Wobble base pairing with the target mRNA. Sequences containing such replacement moieties are suitable for the compositions and methods described herein.

The term "DNA" refers to chromosomal DNA, plasmid DNA, phage DNA, or viral DNA that is single stranded or double stranded. DNA can be obtained from prokaryotes or eukaryotes.

The term "genomic DNA" or gDNA" refers to chromosomal DNA.

The term "messenger RNA" or "mRNA" refers to an RNA that is without introns and that can be translated into a polypeptide. The term "RNA" refers to any RNA, including but not limited to mRNA, tRNA (transfer RNA), rRNA (ribosomal RNA), and/or noncoding RNA (such as lncRNA (long noncoding RNA)).

The term "cDNA" refers to a DNA that is complementary or identical to an RNA, in either single stranded or double stranded form.

As used herein, "polymerase" and its derivatives, generally refers to any enzyme that can catalyze the polymerization of nucleotides (including analogs thereof) into a nucleic acid strand. Typically but not necessarily, such nucleotide polymerization can occur in a template-dependent fashion. Such polymerases can include without limitation naturally occurring polymerases and any subunits and truncations thereof, mutant polymerases, variant polymerases, recombinant, fusion or otherwise engineered polymerases, chemically modified polymerases, synthetic molecules or assemblies, and any analogs, derivatives or fragments thereof that retain the ability to catalyze such polymerization. Optionally, the polymerase can be a mutant polymerase comprising one or more mutations involving the replacement of one or more amino acids with other amino acids, the insertion or deletion of one or more amino acids from the polymerase, or the linkage of parts of two or more polymerases. Typically, the polymerase comprises one or more active sites at which nucleotide binding and/or catalysis of nucleotide polymerization can occur. Some exemplary polymerases include without limitation DNA polymerases and RNA polymerases. The term "polymerase" and its variants, as used herein, also refers to fusion proteins comprising at least two portions linked to each other, where the first portion comprises a peptide that can catalyze the polymerization of nucleotides into a nucleic acid strand and is linked to a second portion that comprises a second polypeptide. In some embodiments, the second polypeptide can include a reporter enzyme or a processivity-enhancing domain. Optionally, the polymerase can possess 5' exonuclease activity or terminal transferase activity. In some embodiments, the polymerase can be optionally reactivated, for example, with the use of heat, chemicals or re-addition of new amounts of polymerase into a reaction mixture. In some embodiments, the polymerase can include a hot-start polymerase or an aptamer based polymerase that optionally can be reactivated.

The term "extension" and its variants, as used herein, when used in reference to a given primer, comprises any in vivo or in vitro enzymatic activity characteristic of a given polymerase that relates to polymerization of one or more nucleotides onto an end of an existing nucleic acid molecule. Typically but not necessarily such primer extension occurs in a template-dependent fashion; during template-dependent extension, the order and selection of bases is driven by established base pairing rules, which can include Watson-Crick type base pairing rules or alternatively (and especially in the case of extension reactions involving nucleotide analogs) by some other type of base pairing paradigm. In one non-limiting example, extension occurs via polymerization of nucleotides on the 3'OH end of the nucleic acid molecule by the polymerase.

The term "amplicon" refers to the amplified product of a nucleic acid amplification reaction, e.g., RT-PCR.

The terms "reverse-transcriptase PCR" and "RT-PCR" refer to a type of PCR where the starting material is RNA. The starting RNA is enzymatically converted to complementary DNA or "cDNA" using a reverse transcriptase enzyme. The cDNA is then used as a template for a PCR reaction.

The terms "PCR product," "PCR fragment," and "amplification product" refer to the resultant mixture of compounds after two or more cycles of the PCR steps of denaturation, annealing and extension are complete. These terms encompass the case where there has been amplification of one or more segments of one or more target sequences.

The term "amplification reagents" refers to those reagents (deoxyribonucleotide triphosphates, buffer, etc.), needed for amplification except for primers, nucleic acid template, and the amplification enzyme. Typically, amplification reagents, along with other reaction components, are placed and contained in a reaction vessel (test tube, microwell, etc.). Amplification methods include PCR methods known to those of skill in the art and also include rolling circle amplification (Blanco et al., *J. Biol. Chem.* 264:8935-8940, 1989), hyperbranched rolling circle amplification (Lizard et al., *Nat. Genetics* 19:225-232, 1998), and loop-mediated isothermal amplification (Notomi et al., *Nuc. Acids Res.* 28:e63, 2000), each of which are hereby incorporated by reference in their entireties.

The term "hybridize" refers to a sequence specific non-covalent binding interaction with a complementary nucleic acid. Hybridization can occur to all or a portion of a nucleic acid sequence. Those skilled in the art will recognize that the stability of a nucleic acid duplex, or hybrids, can be determined by the Tm. Additional guidance regarding hybridization conditions can be found in: Current Protocols in Molecular Biology, John Wiley & Sons, N.Y., 1989, 6.3.1-6.3.6 and in: Sambrook et al., Molecular Cloning, a Laboratory Manual, Cold Spring Harbor Laboratory Press, 1989, Vol. 3.

As used herein, "incorporating" a sequence into a polynucleotide refers to covalently linking a series of nucleotides with the rest of the polynucleotide, for example at the 3' or 5' end of the polynucleotide, by phosphodiester bonds, wherein the nucleotides are linked in the order prescribed by the sequence. A sequence has been "incorporated" into a polynucleotide, or equivalently the polynucleotide "incorporates" the sequence, if the polynucleotide contains the sequence or a complement thereof. Incorporation of a sequence into a polynucleotide can occur enzymatically (e.g., by ligation or polymerization) or using chemical synthesis (e.g., by phosphoramidite chemistry).

As used herein, the terms "amplify" and "amplification" refer to enzymatically copying the sequence of a polynucleotide, in whole or in part, so as to generate more polynucleotides that also contain the sequence or a complement thereof. The sequence being copied is referred to as the template sequence. Examples of amplification include DNA-templated RNA synthesis by RNA polymerase, RNA-templated first-strand cDNA synthesis by reverse transcriptase, and DNA-templated PCR amplification using a thermostable DNA polymerase. Amplification includes all primer-extension reactions. Amplification includes methods such as PCR, ligation amplification (or ligase chain reaction, LCR) and amplification methods. These methods are known and widely practiced in the art. See, e.g., U.S. Pat. Nos. 4,683,195 and 4,683,202 and Innis et al., "PCR protocols: a guide to method and applications" Academic Press, Incorporated (1990) (for PCR); and Wu et al. (1989) Genomics 4:560-569 (for LCR). In general, the PCR procedure describes a method of gene amplification which is comprised of (i) sequence-specific hybridization of primers to specific genes within a DNA sample (or library), (ii) subsequent amplification involving multiple rounds of annealing, elongation, and denaturation using a DNA polymerase, and (iii) screening the PCR products for a band of the correct size. The primers used are oligonucleotides of sufficient length and appropriate sequence to provide initiation of polymerization, i.e. each primer is specifically designed to be complementary to each strand of the genomic locus to be amplified.

Reagents and hardware for conducting amplification reaction are commercially available. Primers useful to amplify sequences from a particular gene region are preferably complementary to, and hybridize specifically to sequences in the target region or in its flanking regions and can be prepared using the polynucleotide sequences provided herein. Nucleic acid sequences generated by amplification can be sequenced directly.

The term "associated" is used herein to refer to the relationship between a sample and the DNA molecules, RNA molecules, or other polynucleotides originating from or derived from that sample. A polynucleotide is associated with a sample if it is an endogenous polynucleotide, i.e., it occurs in the sample at the time the sample is selected, or is derived from an endogenous polynucleotide. For example, the RNAs endogenous to a cell are associated with that cell. cDNAs resulting from reverse transcription of these RNAs, and DNA amplicons resulting from PCR amplification of the cDNAs, contain the sequences of the RNAs and are also associated with the cell. The polynucleotides associated with a sample need not be located or synthesized in the sample, and are considered associated with the sample even after the sample has been destroyed (for example, after a cell has been lysed). Molecular barcoding or other techniques can be used to determine which polynucleotides in a mixture are associated with a particular sample.

When hybridization occurs in an antiparallel configuration between two single-stranded polynucleotides, the reaction is called "annealing" and those polynucleotides are described as "complementary". As used herein, and unless otherwise indicated, the term "complementary," when used to describe a first nucleotide sequence in relation to a second nucleotide sequence, refers to the ability of a polynucleotide comprising the first nucleotide sequence to hybridize and form a duplex structure under certain conditions with a polynucleotide comprising the second nucleotide sequence, as will be understood by the skilled person. Such conditions can, for example, be stringent conditions, where stringent conditions can include: 400 mM NaCl, 40 mM PIPES pH 6.4, 1 mM EDTA, 50° C. or 70° C. for 12-16 hours followed by washing. Other conditions, such as physiologically relevant conditions as can be encountered inside an organism, can apply. The skilled person will be able to determine the set of conditions most appropriate for a test of complementarity of two sequences in accordance with the ultimate application of the hybridized nucleotides.

Complementary sequences include base pairing of a region of a polynucleotide comprising a first nucleotide sequence to a region of a polynucleotide comprising a second nucleotide sequence over the length or a portion of the length of one or both nucleotide sequences. Such sequences can be referred to as "complementary" with respect to each other herein. However, where a first sequence is referred to as "substantially complementary" with respect to a second sequence herein, the two sequences can be complementary, or they can include one or more, but generally not more than about 5, 4, 3, or 2 mismatched base pairs within regions that are base-paired. For two sequences with mismatched base pairs, the sequences will be considered "substantially complementary" as long as the two sequences bind to each other via base pairing.

Conventional notation is used herein to describe nucleotide sequences: the left-hand end of a single-stranded nucleotide sequence is the 5'-end; the left-hand direction of a double-stranded nucleotide sequence is referred to as the 5'-direction. The direction of 5' to 3' addition of nucleotides to nascent RNA transcripts is referred to as the transcription direction. The DNA strand having the same sequence as an mRNA is referred to as the "coding strand"; sequences on the DNA strand having the same sequence as an mRNA transcribed from that DNA and which are located 5' to the 5'-end of the RNA transcript are referred to as "upstream sequences"; sequences on the DNA strand having the same sequence as the RNA and which are 3' to the 3' end of the coding RNA transcript are referred to as "downstream sequences."

In some embodiments, the double stranded DNA fragments can be end polished so that they are amenable for ligation. For example, the ends of the DNA fragments can be polished to have blunt ends. As known in the art, this can be achieved with enzymes that can either fill in or remove the protruding strand. Another method is to perform the ligation in the presence of short synthetic oligonucleotides, called "adapters," which have been prepared in such a way as to eventually ligate with one terminus to the fragment and make the fragment amenable for ligation with polynucleotides of interest such as DNA or RNA tags.

The terms "universal PCR handle," "universal PCR sequence," "PCR handle," "PCR handle sequence," "universal PCR handle," and "universal amplification sequence" refer to a common nucleic acid sequence useful for enabling amplification, such as PCR amplification, and further sequencing of nucleic acid sequences extracted or derived from the biological units. In some embodiments, the PCR handle lacks homology with the template sequence. In other embodiments, the PCR handle sequence is common for the entire sample preparation workflow. The RNA can be reverse transcribed to cDNA and a template switching oligonucleotide (TSO) can be used to introduce a PCR handle downstream of the synthesized cDNA (Zhu, Y. Y. et al., *Biotechniques* 30:892-7 (2001), i.e., to append a PCR handle to the 5' end of full-length cDNAs. The PCR handle is used for subsequent amplification. In some embodiments, having a PCR handle at both the 5' and 3' ends, i.e., 2 PCR handles, can increase amplification efficiency.

A "cell barcode" (cID) is a cellular label that identifies the cell from which the nucleic acids originated from, Each unique cell barcode corresponds to a single cell. A cell barcode can be but is not limited at least about 1, 2, 3, 4, 5, 6, 7, 8, 9, 10, 15, 20, 25, 30, 35, 40, 45, 50 or more nucleotides in length. A cell barcode can be at most about 300, 200, 100, 90, 80, 70, 60, 50, 40, 30, 20, 15, 12, 10, 9, 8, 7, 6, 5, 4 or fewer or more nucleotides in length. In some embodiments, a cell barcode can comprise between about 5 to about 8, about 5 to about 10, about 5 to about 15, about 5 to about 20, about 10 to about 150 nucleotides, or any range of nucleotides described herein.

In some embodiments, the random priming oligonucleotide disclosed herein comprising a cell barcode, UMI, and a random priming region further comprises a universal primer binding site. The universal primer binding site allows the attachment of a universal primer to the labeled-molecule and/or labeled-amplicon. Universal primers are well known in the art and include, but are not limited to, −47F (M13F), alfaMF, AOX3', AOX5', BGH_r, CMV_−30, CMV_−50, CVM_f, LACrmt, lamgda gt10F, lambda gt10R, lambda gt11F, lambda gt11R, M13 rev, M13Forward(−20), M13Reverse, male, p10SEQP_pQE, pA_−120, pet_4, pGAP Forward, pGL_RVpr3, pGLpr2_R, pKLAC1_4, pQE_FS, pQE_RS, puc_U1, puc_U2, revers_A, seq_IRES_tam, seq_IRES_zpet, seq_ori, seq_PCR, seq_RES−, seq_pIRES+, seq_pSecTag, seq_pSecTag+, seq retro+PSI, SP6, T3-prom, T7-prom, and T7-term Inv. Attachment of the universal primer to the universal primer binding site can be used for amplification, detection, and/or sequencing of the labeled-molecule and/or labeled-amplicon. The universal primer binding site can comprise at least about 1, 2, 3, 4, 5, 6, 7, 8, 9, 10, 11, 12, 13, 14, 15, 16, 17, 18, 19, 20, 30, 40, 50, 60, 70, 80, 90, 100, 200, 300, 400, 500, 600, 700, 800, 900, or 1000 nucleotides or base pairs. In another example, the universal primer binding site comprises at least about 1500; 2,000; 2500, 3,000; 3500, 4,000; 4500, 5,000; 5500, 6,000; 6500, 7,000; 7500, 8,000; 8500, 9,000; 9500, or 10,000 nucleotides or base pairs. In some embodiments, the universal primer binding site comprises 10-30 nucleotides or base pairs.

As used herein, the terms "universal primer binding site" and "universal PCR region" can be used interchangeably and refer to a sequence that can be used to prime an amplification reaction.

Unique molecular indices or identifiers (UMIs; also called Random Molecular Tags (RMTs)) are short sequences or "barcodes" of bases used to tag each DNA or RNA molecule (fragment) prior to library amplification, thereby aiding in the identification of each individual nucleic acid molecule, or PCR duplicates. Kivioja, T. et al., *Nat. Methods* 9:72-74 (2012), and Suppl. If two reads align to the same location and have the same UMI, it is highly likely that they are PCR duplicates originating from the same fragment prior to amplification. UMIs can also be used to detect and quantify unique mRNA transcripts. In some embodiments, DNA tags containing the same DNA identifier sequence contain different UMI sequences. In some embodiments, RNA tags containing the same RNA identifier sequence contain different UMI sequences.

The concept of UMIs is that prior to any amplification, each original target molecule is 'tagged' by a unique barcode sequence. This DNA sequence must be long enough to provide sufficient permutations to assign each founder molecule a unique barcode. In some embodiments, a UMI sequence contains randomized nucleotides and is incorporated into the DNA or RNA tag. For example, a 12-base random sequence provides $4^{12}$ or 16,777,216 UMI's for each target molecule in the sample.

As described above, the present methods can employ a reverse transcriptase enzyme that adds one or more non-templated nucleotides (such as Cs) to the end of a nascent cDNA strand upon reaching the 5' end of the template RNA. These nucleotides form a 3' DNA overhang at one end of the RNA/DNA duplex. If a second RNA molecule contains a sequence region, for example, a poly-G tract at its 3' end that is complementary to the non-templated nucleotides, and binds to the non-templated nucleotides, the reverse transcriptase can switch templates and continue extending the cDNA, now using the second RNA molecule as a template. Such a second RNA molecule is referred to herein and known in the art as a template-switching oligo (TSO).

In these embodiments, any reverse transcriptase that has template switching activity can be used.

Methods for reverse transcription and template switching are well known in the art. A procedure frequently referred to as "SMART" (switching mechanism at the 5' end of the RNA transcript) can generate full-length cDNA libraries, even from single-cell-derived RNA samples. This strategy relies on the intrinsic properties of Moloney murine leukemia virus (MMLV) reverse transcriptase and the use of a unique template switching oligonucleotide (TS oligo, or TSO). Moloney Murine Leukemia Virus Reverse Transcriptase (M-MLV RT) is an RNA-dependent DNA polymerase that can be used in cDNA synthesis with long messenger RNA templates (>5 kb). The enzyme is a product of the pol gene of M-MLV and consists of a single subunit with a molecular weight of 71 kDa. During first-strand synthesis, upon reaching the 5' end of the RNA template, the terminal transferase activity of the MMLV reverse transcriptase adds a few additional nucleotides (mostly deoxycytidine) to the 3' end of the newly synthesized cDNA strand. These bases function as a TS oligo-anchoring site. Upon base pairing between the TS oligo and the appended deoxycytidine stretch, the reverse transcriptase "switches" template strands, from cellular RNA to the TS oligo, and continues replication to the 5' end of the TS oligo. By doing so, the resulting cDNA contains the complete 5' end of the transcript, and universal sequences of choice can be added to the reverse transcription product. Along with tagging of the cDNA 3' end by oligo dT primers, this approach makes it possible to efficiently amplify the entire full-length transcript pool in a completely sequence-independent manner.

A TS oligo (TSO) can be a DNA oligo sequence that carries 3 riboguanosines (rGrGrG) at its 3' end. The complementarity between these consecutive rG bases and the 3' dC extension of the cDNA molecule allows the subsequent template switching. The 3' most rG can also be replaced with a locked nucleic acid base (LNA) to enhance thermostability of the LNA monomer, which would be advantageous for base pairing.

A TSO can include a 3' portion comprising a plurality of guanosines or guanosine analogues that base pair with cytosine. Non-limiting examples of guanosines or guanosine analogues useful in the methods described herein include, but are not limited to, deoxyriboguanosine, riboguanosine, locked nucleic acid-guanosine, and peptide nucleic acid-guanosine. The guanosines can be ribonucleosides or locked nucleic acid monomers.

A TSO can include a 3' portion including at least 2, at least 3, at least 4, at least 5, or 2, 3, 4, or 5, or 2-5 guanosines, or guanosine analogues that base pair with cytosine. The presence of a plurality of guanosines (or guanosine analogues that base pair with cytosine) allows the TSO to anneal transiently to the exposed cytosines at the 3' end of the first strand of cDNA. This causes the reverse transcriptase to switch template and continue to synthesis a strand complementary to the TSO. In some aspects, the 3' end of the TSO can be blocked, for example by a 3' phosphate group, to prevent the TSO from functioning as a primer during cDNA synthesis.

Before the cDNA samples are pooled, synthesis of cDNA can be stopped, for example by removing or inactivating the reverse transcriptase. This prevents cDNA synthesis by reverse transcription from continuing in the pooled samples.

The term "polymerase chain reaction" ("PCR") of Mullis (U.S. Pat. Nos. 4,683,195, 4,683,202, and 4,965,188) refers to a method for increasing the concentration of a segment of a target sequence in a mixture of nucleic acid sequences without cloning or purification. This process for amplifying the target sequence consists of introducing a large excess of two oligonucleotide primers to the nucleic acid sequence mixture containing the desired target sequence, followed by a precise sequence of thermal cycling in the presence of a polymerase (e.g., DNA polymerase). The two primers are complementary to their respective strands of the double stranded target sequence. To effect amplification, the mixture is denatured and the primers then annealed to their complementary sequences within the target molecule. Following annealing, the primers are extended with a polymerase to form a new pair of complementary strands. The steps of denaturation, primer annealing, and polymerase extension can be repeated many times (i.e., denaturation, annealing and extension constitute one "cycle;" there can be numerous "cycles") to obtain a high concentration of an amplified segment of the desired target sequence. The length of the amplified segment of the desired target sequence is determined by the relative positions of the primers with respect to each other, and therefore, this length is a controllable parameter. By virtue of the repeating aspect of the process, the method is referred to as the "polymerase chain reaction" (hereinafter "PCR"). Because the desired amplified segments of the target sequence become the predominant sequences (in terms of concentration) in the mixture, they are said to be "PCR amplified."

The methods disclosed herein can further comprise amplifying the cDNA for enrichment with a set of gene specific primers. Target enrichment can be achieved with, e.g., an SPE primer pool, and a boosting primer. Amplicon-based next-generation sequencing (NGS) assays offer many advantages for targeted enrichment. For example, QIAseq NGS panels employ unique molecular indices (UMI's) to correct for PCR amplification bias and use single primer extension (SPE) technology, which provides design flexibility and highly-specific target enrichment. The concept of UMIs is that prior to any amplification, each original target molecule is 'tagged' by a unique barcode sequence. This DNA sequence must be long enough to provide sufficient permutations to assign each founder molecule a unique barcode. In its current form, a 12-base random sequence provides $4^{12}$ or 16,777,216 UMIs for each target molecule in the sample.

As used herein, the term "primer" includes an oligonucleotide, either natural or synthetic, that is capable, upon forming a duplex with a polynucleotide template, of acting as a point of initiation of nucleic acid synthesis and being extended from its 3' end along the template so that an extended duplex is formed. The sequence of nucleotides added during the extension process is determined by the sequence of the template polynucleotide. Usually primers are extended by a DNA polymerase. Primers usually have a length in the range of between 3 to 36 nucleotides, also 5 to 24 nucleotides, also from 14 to 36 nucleotides. Primers can include orthogonal primers, amplification primers, constructions primers and the like. Pairs of primers can flank a sequence of interest or a set of sequences of interest. Primers and probes can be degenerate in sequence. Primers can bind adjacent to a target sequence. A "primer" can be considered a short polynucleotide, generally with a free 3'-OH group that binds to a target or template potentially present in a sample of interest by hybridizing with the target, and thereafter promoting polymerization of a polynucleotide complementary to the target. Primers can be comprised of nucleotides ranging from 17 to 30 nucleotides. In some embodiments, the primer is at least 17 nucleotides, or alternatively, at least 18 nucleotides, or alternatively, at least 19 nucleotides, or alternatively, at least 20 nucleotides, or alternatively, at least 21 nucleotides, or alternatively, at least 22 nucleotides, or alternatively, at least 23 nucleotides, or alternatively, at least 24 nucleotides, or alternatively, at least 25 nucleotides, or alternatively, at least 26 nucleotides, or alternatively, at least 27 nucleotides, or alternatively, at least 28 nucleotides, or alternatively, at least 29 nucleotides, or alternatively, at least 30 nucleotides, or alternatively at least 50 nucleotides, or alternatively at least 75 nucleotides or alternatively at least 100 nucleotides.

As used herein, "target-specific primer" and its derivatives, refers generally to a single stranded or double-stranded polynucleotide, typically an oligonucleotide, that includes at least one sequence that is at least 50% complementary, typically at least 75% complementary or at least 85% complementary, more typically at least 90% complementary, more typically at least 95% complementary, more typically at least 98% or at least 99% complementary, or 100% identical, to at least a portion of a nucleic acid molecule that includes a target sequence. In such instances, the target-specific primer and target sequence are described as "corresponding" to each other. In some embodiments, the target-specific primer is capable of hybridizing to at least a portion of its corresponding target sequence (or to a complement of the target sequence); such hybridization can optionally be performed under standard hybridization conditions or under stringent hybridization conditions. In some embodiments, the target-specific primer is not capable of hybridizing to the target sequence, or to its complement, but is capable of hybridizing to a portion of a nucleic acid strand including the target sequence, or to its complement. In some embodiments, the target-specific primer includes at least one sequence that is at least 75% complementary, typically at least 85% complementary, more typically at least 90% complementary, more typically at least 95% complementary, more typically at least 98% complementary, or more typically at least 99% complementary, to at least a portion of the target sequence itself; in other embodiments, the target-specific primer includes at least one sequence that is at least 75% complementary, typically at least 85% complementary, more typically at least 90% complementary, more typically at least 95% complementary, more typically at least 98% complementary, or more typically at least 99% complementary, to at least a portion of the nucleic acid molecule other than the target sequence. In some embodiments, the target-specific primer is substantially non-complementary to other target sequences present in the sample; optionally, the target-specific primer is substantially non-complementary to other nucleic acid molecules present in the sample. In some embodiments, nucleic acid molecules present in the sample that do not include or correspond to a target sequence (or to a complement of the target sequence) are referred to as "non-specific" sequences or "non-specific nucleic acids". In some embodiments, the target-specific primer is designed to include a nucleotide sequence that is substantially complementary to at least a portion of its corresponding target sequence. In some embodiments, a target-specific primer is at least 95% complementary, or at least 99% complementary, or 100% identical, across its entire length to at least a portion of a nucleic acid molecule that includes its corresponding target sequence. In some embodiments, a target-specific primer can be at least 90%, at least 95% complementary, at least 98% complementary or at least 99% complementary, or 100% identical, across its entire length to at least a portion of its corresponding target sequence. In some embodiments, a forward target-specific primer and a reverse target-specific primer define a target-specific primer pair that can be used to amplify the target sequence via template-dependent primer extension. Typically, each primer of a target-specific primer pair includes at least one sequence that is substantially complementary to at least a portion of a nucleic acid molecule including a corresponding target sequence but that is less than 50% complementary to at least one other target sequence in the sample. In some embodiments, amplification can be performed using multiple target-specific primer pairs in a single amplification reaction, wherein each primer pair includes a forward target-specific primer and a reverse target-specific primer, each including at least one sequence that substantially complementary or substantially identical to a corresponding target sequence in the sample, and each primer pair having a different corresponding target sequence. In some embodiments, the target-specific primer can be substantially non-complementary at its 3' end or its 5' end to any other target-specific primer present in an amplification reaction. In some embodiments, the target-specific primer can include minimal cross hybridization to other target-specific primers in the amplification reaction. In some embodiments, target-specific primers include minimal cross-hybridization to non-specific sequences in the amplification reaction mixture. In some embodiments, the target-specific primers include minimal self-complementarity. In some embodiments, the target-specific primers can include one or more cleavable groups located at the 3' end. In some embodiments, the target-specific primers can include one or more cleavable groups located near or about a central nucleotide of the target-specific primer. In some embodiments, one of more targets-specific primers includes only non-cleavable nucleotides at the 5' end of the target-specific primer. In some embodiments, a target specific primer includes minimal nucleotide sequence overlap at the 3' end or the 5' end of the primer as compared to one or more different target-specific primers, optionally in the same amplification reaction. In some embodiments 1, 2, 3, 4, 5, 6, 7, 8, 9, 10 or more, target-specific primers in a single reaction mixture include one or more of the above embodiments. In some embodiments, substantially all of the plurality of target-specific primers in a single reaction mixture includes one or more of the above embodiments.

Primer design is based on single primer extension, in which each genomic target is enriched by one target-specific primer and one universal primer—a strategy that removes conventional two target-specific primer design restriction and reduces the amount of required primers. All primers required for a panel are pooled into an individual primer pool to reduce panel handling and the number of pools required for enrichment and library construction.

The booster panel is a pool of up to 100 primers that can be used to boost the performance of certain primers in any panel (cataloged, extended, or custom), or to extend the contents of an existing custom panel. The primers are delivered as a single pool that can be spiked into the existing panel.

After removing unused adapters or RT primers, a limited number of PCR cycles can be conducted using an adapter primer and a pool of single primers, each carrying a gene specific sequence and a 5' universal sequence. During this process, each single primer repeatedly samples the same target locus from different DNA templates. Afterwards, additional PCR cycles can be conducted using universal primers to attach complete adapter sequences and to amplify the library to the desired quantity.

A real-time polymerase chain reaction (Real-Time PCR), also known as quantitative polymerase chain reaction (qPCR), is a laboratory technique of molecular biology based on the polymerase chain reaction (PCR). It monitors the amplification of a targeted DNA molecule during the PCR, i.e. in real-time, and not at its end, as in conventional PCR. Real-time PCR can be used quantitatively (quantitative real-time PCR), and semi-quantitatively, i.e. above/below a certain amount of DNA molecules (semi quantitative real-time PCR). Other types of PCRs include but are not limited to nested PCR (used to analyze DNA sequences coming from different organisms of the same species but that can differ for a single nucleotide (SNIPS) and to ensure amplification of the sequence of interest in each of the organism analyzed) and Inverse-PCR (usually used to clone a region flanking an insert or a transposable element).

Two common methods for the detection of PCR products in real-time PCR are: (1) non-specific fluorescent dyes that intercalate with any double-stranded DNA, and (2) sequence-specific DNA probes consisting of oligonucleotides that are labeled with a fluorescent reporter which permits detection only after hybridization of the probe with its complementary sequence.

Methods and kits for performing PCR are well known in the art. PCR is a reaction in which replicate copies are made of a target polynucleotide using a pair of primers or a set of primers consisting of an upstream and a downstream primer, and a catalyst of polymerization, such as a DNA polymerase, and typically a thermally-stable polymerase enzyme. Methods for PCR are well known in the art, and taught, for example in MacPherson et al. (1991) PCR 1: A Practical Approach (IRL Press at Oxford University Press).

In some embodiments, the random priming oligonucleotides disclosed herein can be in solution. Additionally or alternatively, the random priming oligonucleotides can be in contact with a solid support. For example, the solution can be in one or more droplets. Thus, in certain embodiments, a plurality of droplets can be presented, wherein each droplet in the plurality bears a unique sample barcode and/or UMI sequences, each of which are unique to a molecule. Thus, a person of ordinary skill in the art will understand that in some embodiments, the barcodes are unique to a droplet and the UMI are unique to a molecule such that the UMI are repeated many times within a collection of droplets.

In some embodiments, individual cells are contacted with a droplet having a unique set of sample or cell barcodes and/or UMI sequences in order to identify the individual cell. In some embodiments, lysates from individual cells are contacted with a droplet having a unique set of sample barcodes and/or UMI sequences in order to identify the individual cell lysates. In some embodiments, purified nucleic acid from individual cells are contacted with a droplet having a unique set of sample barcodes and/or UMI sequences in order to identify the purified nucleic acid from the individual cell.

In some embodiments, the random priming oligonucleotides can be immobilized to a solid support. For example, the solid support can be one or more beads. Thus, in certain embodiments, a plurality of beads can be presented, wherein each bead in the plurality bears a unique sample barcode and/or UMI sequence. In some embodiments, individual cells are contacted with one or more beads having a unique set of sample or cell barcodes and/or UMI sequences in order to identify the individual cell. The beads can be manipulated in any suitable manner as is known in the art, for example, using droplet actuators.

The terms "solid surface," "solid support" and other grammatical equivalents herein refer to any material that is appropriate for or can be modified to be appropriate for the attachment of the primers, barcodes and sequences described herein. As will be appreciated by those in the art, the number of possible substrates is very large. Possible substrates include, but are not limited to, glass and modified or functionalized glass, plastics (including acrylics, polystyrene and copolymers of styrene and other materials, polypropylene, polyethylene, polybutylene, polyurethanes, Teflon™, etc.), polysaccharides, nylon or nitrocellulose, ceramics, resins, silica or silica-based materials including silicon and modified silicon, carbon, metals, inorganic glasses, plastics, optical fiber bundles, and a variety of other polymers. Particularly useful solid supports and solid surfaces for some embodiments are located within a flow cell apparatus. Exemplary flow cells are set forth in further detail below.

In some embodiments, the solid support comprises an array of wells or depressions in a surface. This can be fabricated as is generally known in the art using a variety of techniques, including, but not limited to, photolithography, stamping techniques, molding techniques and microetching techniques. As will be appreciated by those in the art, the technique used will depend on the composition and shape of the array substrate.

The beads need not be spherical; irregular particles may be used. Alternatively or additionally, the beads may be porous. The bead sizes range from nanometers, i.e. 100 nm, to millimeters, i.e. 1 mm, with beads from about 0.2 micron to about 200 microns being preferred, and from about 0.5 to about 5 micron being particularly preferred, although in some embodiments smaller or larger beads may be used.

The amplified cDNA library can be sequenced and analyzed using methods known to those of skill in the art, e.g., by next-generation sequencing (NGS). In certain exemplary embodiments, RNA expression profiles are determined using any sequencing methods known in the art. Determination of the sequence of a nucleic acid sequence of interest can be performed using a variety of sequencing methods known in the art including, but not limited to, sequencing by synthesis (SBS), sequencing by hybridization (SBH), sequencing by ligation (SBL) (Shendure et al. (2005) Science 309:1728), quantitative incremental fluorescent nucleotide addition sequencing (QIFNAS), stepwise ligation and cleavage, fluorescence resonance energy transfer (FRET), molecular beacons, TaqMan reporter probe digestion, pyrosequencing, fluorescent in situ sequencing (FISSEQ), FISSEQ beads (U.S. Pat. No. 7,425,431), wobble sequencing (PCT/US05/27695), multiplex sequencing (U.S. Ser. No. 12/027,039, filed Feb. 6, 2008; Porreca et al (2007) Nat. Methods 4:931), polymerized colony (POLONY) sequencing (U.S. Pat. Nos. 6,432,360, 6,485,944 and 6,511, 803, and PCT/US05/06425); nanogrid rolling circle sequencing (ROLONY) (US2009/0018024), allele-specific oligo ligation assays (e.g., oligo ligation assay (OLA), single template molecule OLA using a ligated linear probe and a rolling circle amplification (RCA) readout, ligated padlock probes, and/or single template molecule OLA using a ligated circular padlock probe and a rolling circle amplification (RCA) readout) and the like. High-throughput sequencing methods, e.g., using platforms such as Roche 454, Illumina Solexa, AB-SOLiD, Helicos, Complete Genomics, Polonator platforms and the like, can also be utilized. A variety of light-based sequencing technologies are known in the art (Landegren et al. (1998) Genome Res. 8:769-76; Kwok (2000) Pharmacogenomics 1:95-100; and Shi (2001) Clin. Chem. 47:164-172).

Embodiments disclosed herein also provide methods for analyzing gene expression in a plurality of single cells, the method comprising the steps of preparing a cDNA library using the method described herein and sequencing the cDNA library. A "gene" refers to a polynucleotide that can confer biological function after being transcribed and/or translated. Any of the polynucleotide sequences described herein can be used to identify larger fragments or full-length coding sequences of the gene with which they are associated. Methods of isolating larger fragment sequences are known to those of skill in the art.

As used herein, "expression" refers to the process by which polynucleotides are transcribed into RNA or mRNA and/or the process by which the transcribed mRNA is subsequently being translated into peptides, polypeptides, or proteins. If the polynucleotide is derived from genomic DNA, expression can include splicing of the mRNA in a eukaryotic cell.

The cDNA library can be sequenced by any suitable screening method. In particular, the cDNA library can be sequenced using a high-throughput screening method, such as Applied Biosystems' SOLiD sequencing technology, or Illumina's Genome Analyzer. In some embodiments, the cDNA library can be shotgun sequenced. The number of reads can be at least 10,000, at least 1 million, at least 10 million, at least 100 million, or at least 1000 million. In another aspect, the number of reads can be from 10,000 to 100,000, or alternatively from 100,000 to 1 million, or alternatively from 1 million to 10 million, or alternatively from 10 million to 100 million, or alternatively from 100 million to 1000 million. A "read" is a length of continuous nucleic acid sequence obtained by a sequencing reaction.

The methods and random priming oligonucleotides disclosed herein can be useful for, but not limited to, splicing isoform and allele specific expression analysis, RNA variant detection, gene expression analysis, and fusion gene detection.

The expression profiles described herein are useful in the field of predictive medicine in which diagnostic assays, prognostic assays, pharmacogenomics, and monitoring clinical trials are used for prognostic (predictive) purposes to thereby treat an individual prophylactically. Accordingly, some embodiments relate to diagnostic assays for determining the expression profile of nucleic acid sequences (e.g., RNAs), in order to determine whether an individual is at risk of developing a disorder and/or disease. Such assays can be used for prognostic or predictive purposes to thereby prophylactically treat an individual prior to the onset of the disorder and/or disease. Accordingly, in certain exemplary embodiments, methods of diagnosing and/or prognosing one or more diseases and/or disorders using one or more of expression profiling methods described herein are provided.

Some embodiments pertain to monitoring the influence of agents (e.g., drugs or other compounds administered either to inhibit or to treat or prevent a disorder and/or disease) on the expression profile of nucleic acid sequences (e.g., RNAs) in clinical trials. Accordingly, in certain exemplary embodiments, methods of monitoring one or more diseases and/or disorders before, during and/or subsequent to treatment with one or more agents using one or more of expression profiling methods described herein are provided.

Monitoring the influence of agents (e.g., drug compounds) on the level of expression of a marker can be applied not only in basic drug screening, but also in clinical trials. For example, the effectiveness of an agent to affect an expression profile can be monitored in clinical trials of subjects receiving treatment for a disease and/or disorder associated with the expression profile. In certain exemplary embodiments, the methods for monitoring the effectiveness of treatment of a subject with an agent (e.g., an agonist, antagonist, peptidomimetic, protein, peptide, nucleic acid, small molecule, or other drug candidate) comprising the steps of (i) obtaining a pre-administration sample from a subject prior to administration of the agent; (ii) detecting one or more expression profiled in the pre-administration sample; (iii) obtaining one or more post-administration samples from the subject; (iv) detecting one or more expression profiles in the post-administration samples; (v) comparing the one or more expression profiled in the pre-administration sample with the one or more expression profiles in the post-administration sample or samples; and (vi) altering the administration of the agent to the subject accordingly.

The expression profiling methods described herein allow the quantitation of gene expression. Thus, not only tissue specificity, but also the level of expression of a variety of genes in the tissue is ascertainable. Thus, genes can be grouped based on their tissue expression per se and level of expression in that tissue. This is useful, for example, in ascertaining the relationship of gene expression between or among tissues. Thus, one tissue can be perturbed and the effect on gene expression in a second tissue can be determined. In this context, the effect of one cell type on another cell type in response to a biological stimulus can be determined. Such a determination is useful, for example, to know the effect of cell-cell interaction at the level of gene expression. If an agent is administered therapeutically to treat one cell type but has an undesirable effect on another cell type, the methods disclosed herein provides an assay to determine the molecular basis of the undesirable effect and thus provides the opportunity to co-administer a counteracting agent or otherwise treat the undesired effect. Similarly, even within a single cell type, undesirable biological effects can be determined at the molecular level. Thus, the effects of an agent on expression of other than the target gene can be ascertained and counteracted.

In other embodiments, the time course of expression of one or more nucleic acid sequences (e.g., genes, mRNAs and the like) in an expression profile can be monitored. This can occur in various biological contexts, as disclosed herein, for example development of a disease and/or disorder, progression of a disease and/or disorder, and processes, such a cellular alterations associated with the disease and/or disorder.

The expression profiling methods described herein are also useful for ascertaining the effect of the expression of one or more nucleic acid sequences (e.g., genes, mRNAs and the like) on the expression of other nucleic acid sequences (e.g., genes, mRNAs and the like) in the same cell or in different cells. This provides, for example, for a selection of alternate molecular targets for therapeutic intervention if the ultimate or downstream target cannot be regulated.

The expression profiling methods described herein are also useful for ascertaining differential expression patterns of one or more nucleic acid sequences (e.g., genes, mRNAs and the like) in normal and abnormal cells. This provides a battery of nucleic acid sequences (e.g., genes, mRNAs and the like) that could serve as a molecular target for diagnosis or therapeutic intervention.

The methods and random priming oligonucleotides disclosed herein can also be used for analysis of single cell T cell receptor (TCR)/B cell receptor (BCR), splicing variants, long non-coding RNA (lncRNA), etc. as well as in ultra-high throughput single nuclei RNA seq.

EXAMPLES

Example 1

Ten (10) ng human universal RNA were used in setting up the following RT reaction.

| Component | 1 Reaction (uL) |
|---|---|
| 20X First Stand Buffer | 0.25 |
| Different RT Primers | Variable |
| 5 mM dNTP Mix | 0.50 |
| 0.1M DTT | 0.25 |
| RNase Inhibitor (40 U/uL) | 0.25 |
| MgCl2 (60 mM) | 0.25 |
| EZ Reverse Transcriptase (200 U/uL) | 0.25 |
| Human Univ RNA (50 ng/uL) | 0.20 |
| dH20 | Variable |
| Total Volume | 5.00 |

Various RT primers were tested at four different final concentrations (50 nM, 500 nM, 5000 nM, 50000 nM). All RT reactions were conducted at the following conditions: 25° C. for 10 mins, 37° C. for 60 mins, 70° C. for 15 mins, hold at 4° C.

After RT, the amount of cDNA yield was estimated by the average Ct of four gene specific qPCR assays for RPLP0, ACTB, B2M and GAPDH. When the Ct was 40 or N/A, it was shown as no value.

The design of the first random RT primer is important. A regular N6 mer with a long '5 tag sequence (e.g., cell barcoding UMI and universal sequence) are prone to forming primer dimers, which will reduce the effective concentration of free oligos to priming RNA. Typically, such long random oligos will be less efficient in cDNA synthesis compared to N6 mer alone or poly T primers (FIG. 7). Additional random UMI sequence in the oligo will further exacerbate the problem. Inhibitory effects can be seen when too much long random oligo is used, but not for short N6 mers.

```
RT Oligos used:
N6:
NNNNNN

FS2_cl_MT-H8_H6:
                                (SEQ ID NO: 1)
TTCTTAGCGTATTGGAGTCCACAAGT

CACAHHHHHHHHACGTHHHHHH

FS2_cl_MT-N6:
                                (SEQ ID NO: 2)
TTCTTAGCGTATTGGAGTCCACAAGT

CACANNNNNNNNACGTNNNNNN
```

```
FS2m_cl_MT-H10_H6:
                                (SEQ ID NO: 3)
TTCTTACCTCATTCCACTCCACAAGT

CACAHHHHHHHHHHACTCHHHHHH
```

Example 2

Ten (10) ng human universal RNA were used in setting up the following RT reaction.

| Component | 1 Reaction (uL) |
|---|---|
| 20X First Stand Buffer | 0.25 |
| Different RT Primers | Variable |
| 5 mM dNTP Mix | 0.50 |
| 0.1M DTT | 0.25 |
| RNase Inhibitor (40 U/uL) | 0.25 |
| MgCl2 (60 mM) | 0.25 |
| EZ Reverse Transcriptase (200 U/uL) | Variable |
| Human Univ RNA (50 ng/uL) | 0.20 |
| dH20 | Variable |
| Total Volume | 5.00 |

The RT primers and their final concentrations in reaction are listed below.

| polyT-CId tag primer | 50 nM | TTCTTAGCG TATTGGAGT CCAGTCTTC GTCGANNNN NNNNACGTT TTTTTTTTT TTTTTTTVN (SEQ ID NO: 4) |
|---|---|---|
| H6 | 5 uM | HHHHHH |
| FS2m_cl_ MT-H10_ H6 | 5 uM | TTCTTACCT CATTCCACT CCACAAGTC ACAHHHHHH HHHHACTCH HHHHH (SEQ ID NO: 3) |
| M-cl-MT-N5G3/T3 | 5 uM | AGTGATGGTT GAGGATGTGT GGAGAAGTCA CADDDDDDDD DDNNNNNGGG (SEQ ID NO: 5) and AGTGATGGTT GAGGATGTGT GGAGAAGTCA CABBBBBBBB BBNNNNNTTT (SEQ ID NO: 6) |

All RT reactions were conducted at the following conditions: 25° C. for 10 mins, 37° C. for 60 mins, 70° C. for 15 mins, hold at 4° C. Various amount of EZ Reverse Transcriptase per reaction were tested.

After RT, the amount of cDNA yield was estimated by the average Ct of four gene specific qPCR assays for RPLP0, ACTB, B2M and GAPDH.

To reduce the dimer potential of long random oligo structure, the base composition of the random region can be changed, e.g., from N6 to H6 to N5G3/N5T3. N5G3/N5T3 oligos are a mixture of two separately synthesized N5G3 and N5T3 oligos. H6 randomer (A, C, T bases) will be much less likely to form dimers than N6 due to lack of CG pairings.

By restricting but not completely eliminating the randomness of the primer end, significant improvement in cDNA synthesis efficiency (as measured by gene specific RT-qPCR assays) and more tolerance to higher oligo concentrations (FIGS. 7 and 9) can be observed.

Example 3

Ten (10) ng human universal RNA were reverse transcribed into cDNA according to the following setup and conditions: 25° C. for 10 mins, 37° C. for 60 mins, 70° C. for 15 mins, hold at 4° C.

| Component | 1 Reaction (uL) |
|---|---|
| 20X First Stand Buffer | 0.25 |
| RT Primer (variable) | 1.25 |
| 10 mM dNTP Mix | 0.25 |
| 0.1M DTT | 0.25 |
| RNase Inhibitor (40 U/uL) | 0.25 |
| MgCl2 (60 mM) | 0.25 |
| EZ Reverse Transcriptase (200 U/uL) | 0.50 |
| Human Univ RNA (10 ng/uL) | 0.40 |
| ERCC Mix 2 RNA (5 × 10^6 diluted) | 1.00 |
| dH20 | 0.60 |
| Total Volume | 5.00 |

The following RT primers were used at the following final concentrations:

```
polyT-Cid        50 nM    TTCTTAGC
tag primer                GTATTGGA
                          GTCCAGTC
                          TTCGTCGA
                          NNNNNNNN
                          ACGTTTTT
                          TTTTTTTT
                          TTTTTVN
                          (SEQ ID
                          NO: 4)

FS2m_cl_         5 uM     TTCTTAC
MT-H10_H6                 CTCATTC
                          CACTCCA
                          CAAGTCA
                          CAHHHHH
                          HHHHHAC
                          TCHHHHH
                          H
                          (SEQ ID
                          NO: 3)

M-cl-MT-         5 uM     AGTGATG
N5G3/T3                   GTTGAGG
                          ATGTGTG
                          GAGAAGT
                          CACADDD
                          DDDDDDD
                          NNNNNGG
                          G
                          (SEQ ID
                          NO: 5)
                          and
                          AGTGATG
                          GTTGAGG
                          ATGTGTG
                          GAGAAGT
                          CACABBB
                          BBBBBBB
                          NNNNNTT
                          T
                          (SEQ ID
                          NO: 6)
``` cDNA were purified using 2 rounds of 1.2× AMPure XP beads purification.

A set of 220 SPE primers targeting specific mRNAs and a set of 59 primers targeting specific ERCC transcripts were designed. The SPE enrichment reactions were carried out according to the following setup.

| Component | 1 Reaction (uL) |
|---|---|
| mi Script PreAMP Buffer (5X) | 8.00 |
| MgCl2 (80 mM) | 2.00 |
| dNTPs (5 mM) | 3.60 |
| HotStar Taq DNA Pol (6 U/uL) | 1.60 |
| mRNA SPE Primer Pool (400 nM) | 2.00 |
| ERCC SPE Primer Pool (400 nM) | 2.00 |
| Boosting Primer (6 uM) | 2.70 |
| dH20 | 8.10 |
| Template DNA | 10.00 |
| Total Volume | 40.00 |

Different boosting primers were used according to different RT primers:

```
RT primer               Boosting primer polyT-cID tag primer    TTCTTAGCGTATTGGAGTCC
                        (SEQ ID NO: 7)

FS2m_cl_MT-H10_H6       TTCTTACCTCATTCCACTCC
                        (SEQ ID NO: 8)

M-cl-MT-N5G3/T3         GTGAGTGATGGTTGAGGAT
                        (SEQ ID NO: 9)
```

Enrichment reactions were run at the following cycling condition.

1 cycle: 95° C. for 15 mins 10 cycles: 95° C. for 15 secs; 68° C. for 10 mins 1 cycle: 72° C. for 5 mins Hold: 4° C.

Enrichment products were purified using 1 round of 1.2× AMPure XP beads purification and further amplified using universal PCR into NGS libraries.

| Component | 1 Reaction (uL) |
|---|---|
| miScript PreAMP Buffer (5X) | 5.00 |
| MgCl2 (80 mM) | 1.25 |
| dNTPs (5 mM) | 1.25 |
| HotStar Taq DNA Pol (6 U/uL) | 1.00 |
| dH20 | 1.50 |

| Component | 1 Reaction (uL) |
|---|---|
| IL2_N5RS2 (4 uM) | 2.50 |
| Universal Primer (4 uM) | 2.50 |
| Purified SPE DNA | 10.00 |
| Total Volume | 25.00 |

```
IL2 NSRS2:
                                           (SEQ ID NO: 10)
AATGATACGGCGACCACCGAGATCTACACTCTTTCCCTACACGACGCT
CTTCCGATCTNNNNNAATGTACAGTATTGCGTTTTG
```

Different universal primers were used according to different RT primers as follows.

| RT primer | Universal primer |
|---|---|
| polyT-cID tag primer | CAAGCAGAAGACGGCATACGAGATATTGGCGTGACTGGAG TTCAGACGTGTGCTCTTCCGATCTTTCTTAGCGTATTGGAGT CCAGTC (SEQ ID NO: 11) |
| FS2m_c1_MT-H10_H6 | CAAGCAGAAGACGGCATACGAGATGATCTGGTGACTGGAG TTCAGACGTGTGCTCTTCCGATCTTTCTTACCTCATTCCACTC CAC (SEQ ID NO: 12) |
| M-c1-MT-N5G3/T3 | CAAGCAGAAGACGGCATACGAGATTCAAGTGTGACTGGAG TTCAGACGTGTGCTCTTCCGATCTGTGAGTGATGGTTGAGG ATGTGTGGAG (SEQ ID NO: 13) |

Cycling conditions for universal PCR: 1 cycle: 95° C. for 15 mins; 18-24 cycles: 95° C. for 15 secs and 65° C. for 2 mins.

The resulting libraries were quantified and sequenced on MiSeq. The on target and unique UMIs associate with each primers were counted.

To evaluate the effects of random priming oligo vs traditional poly T based oligo on RNA sequence coverage, gene specific single primers with increasing distance from the RNA 3' end were designed (FIG. 11). cDNA was generated using various UMI containing RT primers with anchored poly T sequence end, random H6 end, or random N5G3/T3 ends. Using a simple targeted enrichment reaction (FIG. 10), where no template switching or addition of second PCR handle is needed, a loci can be enriched and sequenced further away from RNA 3' end. After sequencing, the number of UMIs from different cDNA synthesis conditions can be counted. Both H6 and N5G3/T3 based RT oligos generated much higher number of UMIs than poly T based RT oligos, suggesting better sequence coverage for regions further away from 3' end. The UMI counts were also correlated between cDNA generated by two different random primers (FIG. 11).

Example 4

One (1) ng human universal RNA were reverse transcribed into cDNA according to the following setup and conditions: 25° C. for 10 mins, 37° C. for 60 mins, 70° C. for 15 mins, hold at 4° C.

| Component | 1 Reaction (uL) |
|---|---|
| 20X First Stand Buffer | 0.25 |
| RT Primer, variable (20000 nM) | 1.25 |
| 10 mM dNTP Mix | 0.25 |
| 0.1M DTT | 0.25 |
| RNase Inhibitor (40 U/uL) | 0.25 |
| MgCl2 (60 mM) | 0.25 |
| TSO DropS Non 3p block (50 uM) | 0.50 |
| EZ Reverse Transcriptase (200 U/uL) | 0.50 |
| Human Univ RNA (10 ng/uL) | 0.10 |
| ERCC Mix 2 RNA (5 × 10^6 diluted) | 1.00 |
| dH20 | 0.40 |
| Total Volume | 5.00 |

The following RT primers were used at the following final concentrations:

| | | |
|---|---|---|
| TSOm_cI_MT-H10_H6_block | 5 uM | /5Me-isodC//iisodG//iisodG/ AACCACTCCTATCAACCCACACTACAAGTCACAHHHHH HHHHHACTCHHHHHH (SEQ ID NO: 14) |
| TSOm_cI_combo_block | 5 uM | /5Me-isodC//iisodG//iisodG/ AACCACTCCTATCAACCCACACTACAAGTCACADDDDD DDDDDNNNNNGGG (SEQ ID NO: 15); and /5Me-isodC//iisodG//iisodG/ AACCACTCCTATCAACCCACACTACAAGTCACABBBBBB BBBBNNNNNTTT (SEQ ID NO: 16) |

TSO_DropS_Non_3p_block sequence: /5Me-isodC//iisodG//iisodG/

(SEQ ID NO: 17)
AACCACTCCTATCAACCCACACTCAATrGrGrG cDNA was purified using 2 rounds of 0.9× AMPure XP beads purification.

First cDNA amplification was run under the following conditions.

| Component | 1 Reaction (uL) |
|---|---|
| 2X Qiagen HiFi PCR MM (KOD) | 25.00 |
| TSOm PCR 02 27 17 (10 uM) | 4.00 |
| EvaGreen Dye (20X) | 0.00 |
| Purified cDNA Template | 10.00 |
| dH20 | 11.00 |
| Total Volume | 50.00 |

Sequence for TSOm_PCR_02_27_17:
(SEQ ID NO: 18)
AACCACTCCTATCAACCCACACT.

The cycling condition for cDNA amplification was 98° C. for 2 mins; 4 cycles of 98° C. for 20 secs, 65° C. for 45 secs and 72° C. for 3.5 min; 15-18 cycles of 98° C. for 20 secs, 67° C. for 20 secs and 72° C. for 3.5 min; 72° C. for 5 min; hold at 4° C.

The amplified cDNA were purified using 1 round of 0.6× AMPure XP beads purification. Purified cDNA went through fragmentation, end repair, an addition and adapter ligation using QIAseq reagents and protocol.

Fragmentation, end repair, and addition reaction follows:

| Component | 1 Reaction (uL) |
|---|---|
| cDNA Template (variable)* | 9.00 |
| Fragmentation Buffer (10X) | 2.50 |
| Fragmentation Enzyme Mix | 5.00 |
| dH20 | 8.50 |
| Total Volume | 25.00 |

Incubate reactions under the following conditions: 4° C. for 1 mins, 32° C. for 24 mins, 65° C. for 30 mins, hold at 4° C.

Adapter ligation reaction was as follows:

| Component | 1 Reaction (uL) |
|---|---|
| cDNA Template (previous step) | 25.00 |
| Ligation Buffer (5X) | 10.00 |
| GR Illumina Adapter (50 uM) | 1.40 |
| DNA Ligase | 5.00 |
| dH20 | 8.60 |
| Total Volume | 50.00 |

Incubate reactions were under the following conditions: 20° C. for 15 mins, hold at 4° C.

The ligated cDNA fragments were purified using 1 round of 0.6× AMPure XP beads size selection and made into libraries using the following conditions:

| Component | 1 Reaction (uL) |
|---|---|
| miScript PreAMP Buffer (5X) | 5.00 |
| MgCl2 (80 mM) | 1.25 |
| dNTPs (5 mM) | 1.25 |
| Taq DNA Pol (6 U/uL) | 1.00 |
| dH20 | 1.50 |
| IL_F_06_02_16 (4 uM) | 2.50 |
| Universal Primer (4 uM) | 2.50 |
| Purified Ligation cDNA | 10.00 |
| Total Volume | 25.00 |

Sequences for oligos used are as follows:

| | |
|---|---|
| IL_F_06_02_16 | AATGATACGGCGACCACCGA (SEQ ID NO: 19) |
| Universal Primer | CAAGCAGAAGACGGCATACGAGATAAGCTAGTGACTGGAGTTCAGACGTGTGCTCTTCCGATCTAACCACTCCTATCAACCCACACTAC (SEQ ID NO: 20) |

Incubate reactions were under the following conditions: 1 cycle of 95° C. for 15 mins, 10 cycles of 95° C. for 15 secs; 65° C. for 2 mins. The resulting libraries were quantified and sequenced on MiSeq.

Using the "RT-TS" workflow, we also show the full-length coverage of both polyadenylated and non-polyadenylated RNA.

Example 5

Eight to ten (8-10) HT1080 cells were picked by QIAscout per PCR tube containing cell lysis premix with RT primers. RT condition was similar to previous examples with the following specific primer and TSO sequences.

| | |
|---|---|
| RT primer for all 3 workflow | /5Me-isodC//iisodG//iisodG/ AAGCAGTGGTATCAACGCAGAGTACAAGTCACANNNNNNNNNACT CNNNNNGGG (SEQ ID NO: 21) and /5Me-isodC//iisodG//iisodG/ |

```
                    AAGCAGTGGTATCAACGCAGAGTACAAGTCACANNNNNNNNNACT
                    CNNNNNTTT (SEQ ID NO: 22)

TSO oligo for       /5Me-isodC//iisodG//iisodG/
RT-TS workflow      AAGCAGTGGTATCAACGCAGAGTGAATrGrGrG (SEQ ID NO: 23)
``` cDNA were purified using 2 rounds of 0.9× AMPure XP beads cleanup after RT.

For the TdT workflow, the following tailing reaction were run at 37° C. for 15 mins, 72° C. for 15 mins, hold at 4° C.

| Component | 1 Reaction (uL) |
|---|---|
| 10X TdT Reaction Buffer | 1.00 |
| 100 mM dCTP | 1.00 |
| 2.5 mM CoCl2 Solution | 0.00 |
| Terminal Transferase (2 U/uL) | 2.00 |
| Purified cDNA from RT | 10.00 |
| dH20 | 6.00 |
| Total Volume | 20.00 |

Then second strand synthesis was done at 37° C. for 15 mins, 72° C. for 15 mins, hold at 4° C., using the following recipe. cDNA was purified using 1 round 0.9× AMPure XP beads purification:

| Component | 1 Reaction (uL) |
|---|---|
| 10X NEBuffer 2 | 4.00 |
| 10 mM dNTP Mix | 2.00 |
| DNA Poll, Large Fragment (5 U/uL) | 0.50 |
| TSO_GGG (20 uM) | 2.00 |
| Template (cDNA from TdT rxn) | 20.00 |
| dH20 | 11.50 |
| Total Volume | 40.00 |

```
Sequence for TSO_GGG:
                                        (SEQ ID NO: 24)
AAGCAGTGGTATCAACGCAGAGTGAATGGG.
```

For decoupled TS workflow, the following template switching reaction were run at 37° C. for 60 mins, 70° C. for 15 mins, hold at 4° C. cDNA was purified using 0.9× AMPure XP beads purification:

| Component | 1 Reaction (uL) |
|---|---|
| 20X First Stand Buffer | 1.00 |
| 10 mM dNTP Mix | 1.00 |
| MgCl2 (60 mM) | 1.00 |
| 0.1M DTT | 1.00 |
| TSO oligo | 2.00 |
| EZ Reverse Transcriptase (200 U/uL) | 0.50 |
| RNAse H (2 U/uL) | 0.50 |
| Purified cDNA from RT | 10.00 |
| dH20 | 3.00 |
| Total Volume | 20.00 |

Purified cDNA from all three workflows were further amplified and made into NGS libraries as described in earlier examples.

We tested "RT-TS", "Decoupled TS", "TdT" workflows using ~8 HT1080 cells in each RT reaction. The same rGrGrG ending template switching oligo was used for "RT-TS" and "Decoupled TS" workflow, while GGG ending second strand primer is used in "TdT" workflow. The results showed that UMI and cell barcodes were uniformly distributed throughout the gene body without significant 5' or 3' bias (FIG. 12).

Example 6

Twelve (12) individual HT1080 cells were picked by QIAscout into 1 cell per PCR tube containing cell lysis premix with RT primers. Six (6) cells were used in 3' polyT priming workflow, 6 cells were used in random priming and decoupled TS workflow. RT conditions were similar to previous examples with the following specific primers and TSO used.

RT primers sequences follow:

```
TSO_cI01_N8_N5K3    AAGCAGTGGTATCAACGCAGAGTACAAGTCACANNNN
                    NNNNACTCNNNNNGGG (SEQ ID NO: 25) and
                    AAGCAGTGGTATCAACGCAGAGTACAAGTCACANNNN
                    NNNNACTCNNNNNTTT (SEQ ID NO: 26)

TSO_cI02_N8_N5K3    AAGCAGTGGTATCAACGCAGAGTACACACTCACNNNNN
                    NNNACTCNNNNNGGG (SEQ ID NO: 27) and
                    AAGCAGTGGTATCAACGCAGAGTACACACTCACNNNNN
                    NNNACTCNNNNNTTT (SEQ ID NO: 28)

TSO_cI03_N8_N5K3    AAGCAGTGGTATCAACGCAGAGTACACGAAGACNNNN
                    NNNNACTCNNNNNGGG (SEQ ID NO: 29) and
                    AAGCAGTGGTATCAACGCAGAGTACACGAAGACNNNN
                    NNNNACTCNNNNNTTT (SEQ ID NO: 30)

TSO_cI04_N8_N5K3    AAGCAGTGGTATCAACGCAGAGTACAGAGTAGGNNNN
                    NNNNACTCNNNNNGGG (SEQ ID NO: 31) and
                    AAGCAGTGGTATCAACGCAGAGTACAGAGTAGGNNNN
                    NNNNACTCNNNNNTTT (SEQ ID NO: 32)
```

| | |
|---|---|
| TSO_cI05_N8_N5K3 | AAGCAGTGGTATCAACGCAGAGTACAGGTTACGNNNNN<br>NNNNACTCNNNNNGGG (SEQ ID NO: 33) and<br>AAGCAGTGGTATCAACGCAGAGTACAGGTTACGNNNNN<br>NNNNACTCNNNNNTTT (SEQ ID NO: 34) |
| TSO_cI06_N8_N5K3 | AAGCAGTGGTATCAACGCAGAGTACATAGGAGTNNNN<br>NNNNACTCNNNNNGGG (SEQ ID NO: 35) and<br>AAGCAGTGGTATCAACGCAGAGTACATAGGAGTNNNN<br>NNNNACTCNNNNNTTT (SEQ ID NO: 36) |
| sc_WTS_RT_Primer_cID01 | AAGCAGTGGTATCAACGCAGAGTACAAGTCACANNNN<br>NNNNNACGTTTTTTTTTTTTTTTTTVN (SEQ ID NO: 37) |
| sc_WTS_RT_Primer_cID02 | AAGCAGTGGTATCAACGCAGAGTACACACTCACNNNNN<br>NNNACGTTTTTTTTTTTTTTTTVN (SEQ ID NO: 38) |
| sc_WTS_RT_Primer_cID03 | AAGCAGTGGTATCAACGCAGAGTACACGAAGACNNNN<br>NNNNACGTTTTTTTTTTTTTTTTVN (SEQ ID NO: 39) |
| sc_WTS_RT_Primer_cID04 | AAGCAGTGGTATCAACGCAGAGTACAGAGTAGGNNNN<br>NNNNACGTTTTTTTTTTTTTTTTVN (SEQ ID NO: 40) |
| sc_WTS_RT_Primer_cID05 | AAGCAGTGGTATCAACGCAGAGTACAGGTTACGNNNN<br>NNNNACGTTTTTTTTTTTTTTTTVN (SEQ ID NO: 41) |
| sc_WTS_RT_Primer_cID06 | AAGCAGTGGTATCAACGCAGAGTACATAGGAGTNNNN<br>NNNNACGTTTTTTTTTTTTTTTTVN (SEQ ID NO: 42) |
| TSO oligo | /5Me-isodC//iisodG//iisodG/AAGCAGTGGTATCAACGCAGAGTGAATrGrGrG (SEQ ID NO: 23) | cDNA from 6 individual RT reactions per workflow were pooled together and purified using 2 rounds of 0.9× AMPure XP beads cleanup after RT.

For decoupled TS workflow, the following template switching reaction were run at 37° C. for 60 mins, 70° C. for 15 mins, hold at 4° C. cDNA was purified using 0.9× AMPure XP beads purification:

| Component | 1 Reaction (uL) |
|---|---|
| 20X First Stand Buffer | 1.00 |
| 10 mM dNTP Mix | 1.00 |
| MgCl2 (60 mM) | 1.00 |
| 0.1M DTT | 1.00 |
| TSO oligo | 2.00 |
| EZ Reverse Transcriptase (200 U/uL) | 0.50 |
| RNAse H (2U /uL) | 0.50 |
| Purified cDNA from RT | 10.00 |
| dH20 | 3.00 |
| Total Volume | 20.00 |

Purified cDNAs from both workflows were further amplified and made into NGS libraries as described in earlier examples. The two libraries were sequenced on MiSeq.

Individual cells with different cell barcodes using either random primer or polyT primer were indexed, 6 cells were pooled together after RT reaction, and whole transcriptome libraries were made. With polyT primers, the QIAseq UPX workflow was followed. With random primers, the "decoupled TS" workflow was followed. The random primers and "decoupled TS" workflow clearly showed much more uniform 5'-3' gene coverage than polyT primers (FIG. 13).

Different workflows and different designs of second strand primer can have big impact on the total number of UMIs recovered after sequencing. Having more UMIs after sequencing indicates overall higher reaction efficacy, and can lead to higher RNA detection sensitivity, especially important for low expression transcripts. Using second strand primers ending in N5G3 in the "TdT" (C tailing) workflow or template switching oligo ending in N5G3 can yield much higher UMI and more gene detected that other alternative configurations.

Example 7

In this experiment, the total UMI counts after three different workflows were compared: polyT RT priming and UPX workflow with regular template switching oligo; random N5G3/T3 RT priming and "TdT" v2 workflow using N5G3 ending second strand primer; random N5G3/T3 RT priming and "decoupled TS" v2 workflow using N5G3 ending template switching oligo. Results showed both higher number of UMIs and higher number of detectable genes for both "TdT" v2 and "decoupled TS" v2 workflows than traditional 3' biased polyT priming approach.

Four to six HT1080 cells were picked by QIAscout into three different PCR tubes containing cell lysis premix with RT primers. In a separate experiment, individual HT1080 cells were picked by QIAscout into each PCR tube and, later, single cells used for the same workflow were pooled together after RT reactions. Three different workflows were compared.

First, 3' UPX workflow was followed as before using polyT RT primers with cell ID and UMI.

RT Oligos Used:

| Primer | Sequence | SEQ ID NO |
|---|---|---|
| sc_WTS_RT_Primer_cID01 | AAGCAGTGGTATCAACGCAGAGTACAAGTCACANNNNNNNNACGTTTTTTTTTTTTTTTTTTVN | 37 |
| sc_WTS_RT_Primer_cID02 | AAGCAGTGGTATCAACGCAGAGTACACACTCACNNNNNNNNACGTTTTTTTTTTTTTTTTTTVN | 38 |
| sc_WTS_RT_Primer_cID03 | AAGCAGTGGTATCAACGCAGAGTACACGAAGACNNNNNNNNACGTTTTTTTTTTTTTTTTTTVN | 39 |
| sc_WTS_RT_Primer_cID04 | AAGCAGTGGTATCAACGCAGAGTACAGAGTAGGNNNNNNNNACGTTTTTTTTTTTTTTTTTTVN | 40 |
| sc_WTS_RT_Primer_cID05 | AAGCAGTGGTATCAACGCAGAGTACAGGTTACGNNNNNNNNACGTTTTTTTTTTTTTTTTTTVN | 41 |
| sc_WTS_RT_Primer_cID06 | AAGCAGTGGTATCAACGCAGAGTACATAGGAGTNNNNNNNNACGTTTTTTTTTTTTTTTTTTVN | 42 |
| sc_WTS_RT_Primer_cID07 | AAGCAGTGGTATCAACGCAGAGTACCACATGTCNNNNNNNNACGTTTTTTTTTTTTTTTTTTVN | 43 |
| sc_WTS_RT_Primer_cID08 | AAGCAGTGGTATCAACGCAGAGTACCATCTGACNNNNNNNNACGTTTTTTTTTTTTTTTTTTVN | 44 |
| M_cID01_D10_N5G3 | GTGAGTGATGGTTGAGGATGTGTGGAGAAGTTCGTGCDDDDDDDDDDNNNNNGGG | 45 |
| M_cID01_B10_N5T3 | GTGAGTGATGGTTGAGGATGTGTGGAGAAGTTCGTGCBBBBBBBBBBNNNNNTTT | 46 |
| M_cID02_D10_N5G3 | GTGAGTGATGGTTGAGGATGTGTGGAGATCGTGTTCTDDDDDDDDDDNNNNNGGG | 47 |
| M_cID02_B10_N5T3 | GTGAGTGATGGTTGAGGATGTGTGGAGATCGTGTTCTBBBBBBBBBBNNNNNTTT | 48 |
| M_cID03_D10_N5G3 | GTGAGTGATGGTTGAGGATGTGTGGAGATGTCTTACGDDDDDDDDDDNNNNNGGG | 49 |
| M_cID03_B10_N5T3 | GTGAGTGATGGTTGAGGATGTGTGGAGATGTCTTACGBBBBBBBBBBNNNNNTTT | 50 |
| M_cID04_D10_N5G3 | GTGAGTGATGGTTGAGGATGTGTGGAGCAGTCCAATTDDDDDDDDDDNNNNNGGG | 51 |
| M_cID04_B10_N5T3 | GTGAGTGATGGTTGAGGATGTGTGGAGCAGTCCAATTBBBBBBBBBBNNNNNTTT | 52 |
| M_cID05_D10_N5G3 | GTGAGTGATGGTTGAGGATGTGTGGAGCATTCGCGTCDDDDDDDDDDNNNNNGGG | 53 |
| M_cID05_B10_N5T3 | GTGAGTGATGGTTGAGGATGTGTGGAGCATTCGCGTCBBBBBBBBBBNNNNNTTT | 54 |
| M_cID06_D10_N5G3 | GTGAGTGATGGTTGAGGATGTGTGGAGCCGATGGTTGDDDDDDDDDDNNNNNGGG | 55 |
| M_cID06_B10_N5T3 | GTGAGTGATGGTTGAGGATGTGTGGAGCCGATGGTTGBBBBBBBBBBNNNNNTTT | 56 |
| M_cID07_D10_N5G3 | GTGAGTGATGGTTGAGGATGTGTGGAGCCGGTAAGCTDDDDDDDDDDNNNNNGGG | 57 |
| M_cID07_B10_N5T3 | GTGAGTGATGGTTGAGGATGTGTGGAGCCGGTAAGCTBBBBBBBBBBNNNNNTTT | 58 |
| M_cID08_D10_N5G3 | GTGAGTGATGGTTGAGGATGTGTGGAGCCGTCTGAACDDDDDDDDDDNNNNNGGG | 59 |
| M_cID08_B10_N5T3 | GTGAGTGATGGTTGAGGATGTGTGGAGCCGTCTGAACBBBBBBBBBBNNNNNTTT | 60 |

Template Switching Oligos Used:

| | |
|---|---|
| TSO_DropS | AAGCAGTGGTATCAACGCAGAGTGAATrGrGrG (SEQ ID NO: 61) |
| TSO_Drop_mod2 | /5Me-isodC//iisodG//iisodG/ AAGCAGTGGTATCAACGCAGAGTGAATrGrGrG (SEQ ID NO: 23) |
| TSO_N5G3 | AAGCAGTGGTATCAACGCAGAGTGAATNNNNNGGG (SEQ ID NO: 62) |

For the "TdT" v2 workflow and the "Decoupled TS" v2 workflow, RT reactions generally followed conditions in previous examples except that the following RT primers were used (an example RT primer with a specific cell index; the cell index region is underlined):

| | |
|---|---|
| RT primer cI_D10_N5K3 | GTGAGTGATGGTTGAGGATGTGTGGAG<u>AAGTCACA</u>DD DDDDDDDDNNNNNGGG (SEQ ID NO: 63) and GTGAGTGATGGTTGAGGATGTGTGGAG<u>AAGTCACA</u>BB BBBBBBBBNNNNNTTT (SEQ ID NO: 64) |

The tailing and second strand synthesis reaction in the "TdT" v2 workflow and the TS reaction in the "Decoupled TS" v2 workflow generally followed conditions in previous examples except the following oligo was used as both second strand primer (in "TdT") and template switch oligo (in "Decoupled TS").

Second strand oligo:
(SEQ ID NO: 65)
AAGCAGTGGTATCAACGCAGAGTGAATNNNNNGGG.

Afterwards, for both "TdT" v2 and "Decoupled TS" v2 workflow, cDNA were purified and further amplified using the following pair of PCR primers.

| | |
|---|---|
| AAGCAGTGGTATCAACGCAGAGT | (SEQ ID NO: 66) |
| GTGAGTGATGGTTGAGGATGTGTG | (SEQ ID NO: 67) |

Amplified cDNA were made into NGS libraries as described in earlier examples. The libraries were then sequenced on MiSeq. Results are provided in FIG. 14.

The foregoing description of the specific embodiments will so fully reveal the general nature of the invention that others can, by applying knowledge within the skill of the art, readily modify and/or adapt for various applications, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

All of the various aspects, embodiments, and options described herein can be combined in any and all variations.

All publications, patents, and patent applications mentioned in this specification are herein incorporated by reference to the same extent as if each individual publication, patent, or patent application was specifically and individually indicated to be herein incorporated by reference.

What is claimed is:

1. A method of generating a cDNA sample, comprising
adding to an RNA sample, a plurality of random priming oligonucleotides, each random priming oligonucleotide comprising a cell barcode (cID), a unique molecular index (UMI), and a random sequence region of 5 to 8 nucleotides, and
performing a reverse transcription reaction (RT),
wherein the random sequence region consists of (a) random nucleotides selected from A, C, and T bases; (b) 5 random nucleotides selected from A, C, G, and T bases and 3 G bases; (c) 5 random nucleotides selected from A, C, G, and T bases and 3 G bases in a 5' to 3' direction; (d) 5 random nucleotides selected from A, C, G, and T bases and 3 T bases; or (e) 5 random nucleotides selected from A, C, G, and T bases and 3 T bases in a 5' to 3' direction.

2. The method of claim 1, wherein the random priming oligonucleotides further comprise a universal PCR handle.

3. The method of claim 2, further comprising adding a template switching oligonucleotide (TSO) comprising a 5' universal PCR handle and performing a template switching reaction (TS) to generate a cDNA sample comprising a universal PCR handle at the 5' end and at the 3' end.

4. The method of claim 3, wherein the TS is decoupled from the RT.

5. The method of claim 2, further comprising adding a homopolymer oligonucleotide tail to a first strand cDNA by adding a terminal transferase (TdT) and then performing a primer extension reaction using a template switching oligonucleotide (TSO) comprising a 5' universal PCR handle, wherein the TSO hybridizes to the homopolymer oligonucleotide tail and the primer extension reaction generates a second strand cDNA comprising a universal PCR handle at the 5' end and at the 3' end.

6. The method of claim 1, wherein two or more of the random priming oligonucleotides bind to a single RNA molecule.

7. The method of claim 1, further comprising performing an amplification reaction to generate a cDNA sample.

8. The method of claim 7, further comprising sequencing the cDNA sample.

* * * * *

SEQUENCE LISTING

<160> NUMBER OF SEQ ID NOS: 68

<210> SEQ ID NO 1
<211> LENGTH: 48
<212> TYPE: DNA
<213> ORGANISM: Artificial Sequence
<220> FEATURE:
<223> OTHER INFORMATION: RT Oligos

<400> SEQUENCE: 1
ttcttagcgt attggagtcc acaagtcaca hhhhhhhhac gthhhhhh                48

<210> SEQ ID NO 2
<211> LENGTH: 48
<212> TYPE: DNA
<213> ORGANISM: Artificial Sequence
<220> FEATURE:
<223> OTHER INFORMATION: RT Oligos
<220> FEATURE:

```
<221> NAME/KEY: misc_feature
<222> LOCATION: (31)..(38)
<223> OTHER INFORMATION: n is a, c, g, or t
<220> FEATURE:
<221> NAME/KEY: misc_feature
<222> LOCATION: (43)..(48)
<223> OTHER INFORMATION: n is a, c, g, or t

<400> SEQUENCE: 2
ttcttagcgt attggagtcc acaagtcaca nnnnnnnnac gtnnnnnn         48

<210> SEQ ID NO 3
<211> LENGTH: 50
<212> TYPE: DNA
<213> ORGANISM: Artificial Sequence
<220> FEATURE:
<223> OTHER INFORMATION: RT Oligos

<400> SEQUENCE: 3
ttcttacctc attccactcc acaagtcaca hhhhhhhhhh actchhhhhh       50

<210> SEQ ID NO 4
<211> LENGTH: 63
<212> TYPE: DNA
<213> ORGANISM: Artificial Sequence
<220> FEATURE:
<223> OTHER INFORMATION: polyT-cID tag primer
<220> FEATURE:
<221> NAME/KEY: misc_feature
<222> LOCATION: (33)..(40)
<223> OTHER INFORMATION: n is a, c, g, or t
<220> FEATURE:
<221> NAME/KEY: misc_feature
<222> LOCATION: (63)..(63)
<223> OTHER INFORMATION: n is a, c, g, or t

<400> SEQUENCE: 4
ttcttagcgt attggagtcc agtcttcgtc gannnnnnnn acgttttttt tttttttttt   60 tvn                                                               63

<210> SEQ ID NO 5
<211> LENGTH: 50
<212> TYPE: DNA
<213> ORGANISM: Artificial Sequence
<220> FEATURE:
<223> OTHER INFORMATION: M-cl-MT-N5G3/T3
<220> FEATURE:
<221> NAME/KEY: misc_feature
<222> LOCATION: (43)..(47)
<223> OTHER INFORMATION: n is a, c, g, or t

<400> SEQUENCE: 5
agtgatggtt gaggatgtgt ggagaagtca caddddddddd ddnnnnnggg          50

<210> SEQ ID NO 6
<211> LENGTH: 50
<212> TYPE: DNA
<213> ORGANISM: Artificial Sequence
<220> FEATURE:
<223> OTHER INFORMATION: M-cl-MT-N5G3/T3
<220> FEATURE:
<221> NAME/KEY: misc_feature
<222> LOCATION: (43)..(47)
<223> OTHER INFORMATION: n is a, c, g, or t

<400> SEQUENCE: 6
agtgatggtt gaggatgtgt ggagaagtca cabbbbbbbbb bbnnnnnttt          50
```

<210> SEQ ID NO 7
<211> LENGTH: 20
<212> TYPE: DNA
<213> ORGANISM: Artificial Sequence
<220> FEATURE:
<223> OTHER INFORMATION: polyT-cID tag primer

<400> SEQUENCE: 7
ttcttagcgt attggagtcc                                                 20

<210> SEQ ID NO 8
<211> LENGTH: 20
<212> TYPE: DNA
<213> ORGANISM: Artificial Sequence
<220> FEATURE:
<223> OTHER INFORMATION: FS2m_cl_MT-H10_H6

<400> SEQUENCE: 8
ttcttacctc attccactcc                                                 20

<210> SEQ ID NO 9
<211> LENGTH: 19
<212> TYPE: DNA
<213> ORGANISM: Artificial Sequence
<220> FEATURE:
<223> OTHER INFORMATION: M-cl-MT-N5G3/T3

<400> SEQUENCE: 9
gtgagtgatg gttgaggat                                                  19

<210> SEQ ID NO 10
<211> LENGTH: 84
<212> TYPE: DNA
<213> ORGANISM: Artificial Sequence
<220> FEATURE:
<223> OTHER INFORMATION: [0137] IL2_NSRS2
<220> FEATURE:
<221> NAME/KEY: misc_feature
<222> LOCATION: (59)..(63)
<223> OTHER INFORMATION: n is a, c, g, or t

<400> SEQUENCE: 10
aatgatacgg cgaccaccga gatctacact ctttccctac acgacgctct tccgatctnn     60
nnnaatgtac agtattgcgt tttg                                            84

<210> SEQ ID NO 11
<211> LENGTH: 88
<212> TYPE: DNA
<213> ORGANISM: Artificial Sequence
<220> FEATURE:
<223> OTHER INFORMATION: polyT-cID tag primer

<400> SEQUENCE: 11
caagcagaag acggcatacg agatattggc gtgactggag ttcagacgtg tgctcttccg     60
atctttctta gcgtattgga gtccagtc                                        88

<210> SEQ ID NO 12
<211> LENGTH: 86
<212> TYPE: DNA
<213> ORGANISM: Artificial Sequence
<220> FEATURE:
<223> OTHER INFORMATION: FS2m_cl_MT-H10_H6

<400> SEQUENCE: 12
caagcagaag acggcatacg agatgatctg gtgactggag ttcagacgtg tgctcttccg     60
atctttctta cctcattcca ctccac                                              86

<210> SEQ ID NO 13
<211> LENGTH: 91
<212> TYPE: DNA
<213> ORGANISM: Artificial Sequence
<220> FEATURE:
<223> OTHER INFORMATION: M-cl-MT-N5G3/T3

<400> SEQUENCE: 13
caagcagaag acggcatacg agattcaagt gtgactggag ttcagacgtg tgctcttccg        60
atctgtgagt gatggttgag gatgtgtgga g                                       91

<210> SEQ ID NO 14
<211> LENGTH: 55
<212> TYPE: DNA
<213> ORGANISM: Artificial Sequence
<220> FEATURE:
<223> OTHER INFORMATION: TSOm_cI_MT-H10_H6_block
<220> FEATURE:
<221> NAME/KEY: misc_feature
<222> LOCATION: (1)..(1)
<223> OTHER INFORMATION: c is 5methyl-deoxyisocytidine
<220> FEATURE:
<221> NAME/KEY: misc_feature
<222> LOCATION: (2)..(3)
<223> OTHER INFORMATION: g is deoxyiso guanosine

<400> SEQUENCE: 14
cggaccactc ctatcaaccc acactacaag tcacahhhhh hhhhhactch hhhhh              55

<210> SEQ ID NO 15
<211> LENGTH: 54
<212> TYPE: DNA
<213> ORGANISM: Artificial Sequence
<220> FEATURE:
<223> OTHER INFORMATION: TSOm_cI_combo_block
<220> FEATURE:
<221> NAME/KEY: misc_feature
<222> LOCATION: (1)..(1)
<223> OTHER INFORMATION: c is 5methyl-deoxyisocytidine
<220> FEATURE:
<221> NAME/KEY: misc_feature
<222> LOCATION: (2)..(3)
<223> OTHER INFORMATION: g is deoxyiso guanosine
<220> FEATURE:
<221> NAME/KEY: misc_feature
<222> LOCATION: (47)..(51)
<223> OTHER INFORMATION: n is a, c, g, or t

<400> SEQUENCE: 15
cggaaccact cctatcaacc cacactacaa gtcacadddd dddddnnnn nggg                54

<210> SEQ ID NO 16
<211> LENGTH: 54
<212> TYPE: DNA
<213> ORGANISM: Artificial Sequence
<220> FEATURE:
<223> OTHER INFORMATION: TSOm_cI_combo_block
<220> FEATURE:
<221> NAME/KEY: misc_feature
<222> LOCATION: (1)..(1)
<223> OTHER INFORMATION: c is 5methyl-deoxyisocytidine
<220> FEATURE:
<221> NAME/KEY: misc_feature
<222> LOCATION: (2)..(3)
<223> OTHER INFORMATION: g is deoxyiso guanosine
<220> FEATURE:
<221> NAME/KEY: misc_feature
<222> LOCATION: (47)..(51)
<223> OTHER INFORMATION: n is a, c, g, or t

```
<400> SEQUENCE: 16
cggaaccact cctatcaacc cacactacaa gtcacabbbb bbbbbbnnnn nttt         54

<210> SEQ ID NO 17
<211> LENGTH: 33
<212> TYPE: DNA
<213> ORGANISM: Artificial Sequence
<220> FEATURE:
<223> OTHER INFORMATION: [0143] TSO_DropS_Non_3p_block
<220> FEATURE:
<221> NAME/KEY: misc_feature
<222> LOCATION: (1)..(1)
<223> OTHER INFORMATION: c is 5methyl-deoxyisocytidine
<220> FEATURE:
<221> NAME/KEY: misc_feature
<222> LOCATION: (2)..(3)
<223> OTHER INFORMATION: g is deoxyiso guanosine
<220> FEATURE:
<221> NAME/KEY: misc_feature
<222> LOCATION: (31)..(33)
<223> OTHER INFORMATION: g is riboguanosine

<400> SEQUENCE: 17
cggaaccact cctatcaacc cacactcaat ggg                               33

<210> SEQ ID NO 18
<211> LENGTH: 23
<212> TYPE: DNA
<213> ORGANISM: Artificial Sequence
<220> FEATURE:
<223> OTHER INFORMATION: Sequence for TSOm_PCR_02_27_17

<400> SEQUENCE: 18
aaccactcct atcaacccac act                                          23

<210> SEQ ID NO 19
<211> LENGTH: 20
<212> TYPE: DNA
<213> ORGANISM: Artificial Sequence
<220> FEATURE:
<223> OTHER INFORMATION: IL_F_06_02_16

<400> SEQUENCE: 19
aatgatacgg cgaccaccga                                              20

<210> SEQ ID NO 20
<211> LENGTH: 89
<212> TYPE: DNA
<213> ORGANISM: Artificial Sequence
<220> FEATURE:
<223> OTHER INFORMATION: Universal Primer

<400> SEQUENCE: 20
caagcagaag acggcatacg agataagcta gtgactggag ttcagacgtg tgctcttccg   60
atctaaccac tcctatcaac ccacactac                                    89

<210> SEQ ID NO 21
<211> LENGTH: 56
<212> TYPE: DNA
<213> ORGANISM: Artificial Sequence
<220> FEATURE:
<223> OTHER INFORMATION: RT primer for all 3 workflow
<220> FEATURE:
<221> NAME/KEY: misc_feature
<222> LOCATION: (1)..(1)
<223> OTHER INFORMATION: c is 5methyl-deoxyisocytidine
<220> FEATURE:
```

```
<221> NAME/KEY: misc_feature
<222> LOCATION: (2)..(3)
<223> OTHER INFORMATION: g is deoxyiso guanosine
<220> FEATURE:
<221> NAME/KEY: misc_feature
<222> LOCATION: (37)..(44)
<223> OTHER INFORMATION: n is a, c, g, or t
<220> FEATURE:
<221> NAME/KEY: misc_feature
<222> LOCATION: (49)..(53)
<223> OTHER INFORMATION: n is a, c, g, or t

<400> SEQUENCE: 21
cggaagcagt ggtatcaacg cagagtacaa gtcacannnn nnnnactcnn nnnggg     56

<210> SEQ ID NO 22
<211> LENGTH: 56
<212> TYPE: DNA
<213> ORGANISM: Artificial Sequence
<220> FEATURE:
<223> OTHER INFORMATION: RT primer for all 3 workflow
<220> FEATURE:
<221> NAME/KEY: misc_feature
<222> LOCATION: (1)..(1)
<223> OTHER INFORMATION: c is 5methyl-deoxyisocytidine
<220> FEATURE:
<221> NAME/KEY: misc_feature
<222> LOCATION: (2)..(3)
<223> OTHER INFORMATION: g is deoxyiso guanosine
<220> FEATURE:
<221> NAME/KEY: misc_feature
<222> LOCATION: (37)..(44)
<223> OTHER INFORMATION: n is a, c, g, or t
<220> FEATURE:
<221> NAME/KEY: misc_feature
<222> LOCATION: (49)..(53)
<223> OTHER INFORMATION: n is a, c, g, or t

<400> SEQUENCE: 22
cggaagcagt ggtatcaacg cagagtacaa gtcacannnn nnnnactcnn nnnttt     56

<210> SEQ ID NO 23
<211> LENGTH: 33
<212> TYPE: DNA
<213> ORGANISM: Artificial Sequence
<220> FEATURE:
<223> OTHER INFORMATION: TSO oligo for RT-TS workflow
<220> FEATURE:
<221> NAME/KEY: misc_feature
<222> LOCATION: (1)..(1)
<223> OTHER INFORMATION: c is 5methyl-deoxyisocytidine
<220> FEATURE:
<221> NAME/KEY: misc_feature
<222> LOCATION: (2)..(3)
<223> OTHER INFORMATION: g is deoxyiso guanosine
<220> FEATURE:
<221> NAME/KEY: misc_feature
<222> LOCATION: (31)..(33)
<223> OTHER INFORMATION: g is riboguanosine

<400> SEQUENCE: 23
cggaagcagt ggtatcaacg cagagtgaat ggg                              33

<210> SEQ ID NO 24
<211> LENGTH: 30
<212> TYPE: DNA
<213> ORGANISM: Artificial Sequence
<220> FEATURE:
<223> OTHER INFORMATION: Sequence for TSO_GGG

<400> SEQUENCE: 24
aagcagtggt atcaacgcag agtgaatggg                                  30
```

<210> SEQ ID NO 25
<211> LENGTH: 53
<212> TYPE: DNA
<213> ORGANISM: Artificial Sequence
<220> FEATURE:
<223> OTHER INFORMATION: TSO_cI01_N8_N5K3
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (46)..(50)
<223> OTHER INFORMATION: n is a, c, g, or t

<400> SEQUENCE: 25
aagcagtggt atcaacgcag agtacaagtc acannnnnnn nactcnnnnn ggg         53

<210> SEQ ID NO 26
<211> LENGTH: 53
<212> TYPE: DNA
<213> ORGANISM: Artificial Sequence
<220> FEATURE:
<223> OTHER INFORMATION: TSO_cI01_N8_N5K3
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (46)..(50)
<223> OTHER INFORMATION: n is a, c, g, or t

<400> SEQUENCE: 26
aagcagtggt atcaacgcag agtacaagtc acannnnnnn nactcnnnnn ttt         53

<210> SEQ ID NO 27
<211> LENGTH: 53
<212> TYPE: DNA
<213> ORGANISM: Artificial Sequence
<220> FEATURE:
<223> OTHER INFORMATION: TSO_cI02_N8_N5K3
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (46)..(50)
<223> OTHER INFORMATION: n is a, c, g, or t

<400> SEQUENCE: 27
aagcagtggt atcaacgcag agtacacact cacnnnnnnn nactcnnnnn ggg         53

<210> SEQ ID NO 28
<211> LENGTH: 53
<212> TYPE: DNA
<213> ORGANISM: Artificial Sequence
<220> FEATURE:
<223> OTHER INFORMATION: TSO_cI02_N8_N5K3
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (46)..(50)
<223> OTHER INFORMATION: n is a, c, g, or t

<400> SEQUENCE: 28

```
aagcagtggt atcaacgcag agtacacact cacnnnnnnn nactcnnnnn ttt          53
```

<210> SEQ ID NO 29
<211> LENGTH: 53
<212> TYPE: DNA
<213> ORGANISM: Artificial Sequence
<220> FEATURE:
<223> OTHER INFORMATION: TSO_cI03_N8_N5K3
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (46)..(50)
<223> OTHER INFORMATION: n is a, c, g, or t

<400> SEQUENCE: 29

```
aagcagtggt atcaacgcag agtacacgaa gacnnnnnnn nactcnnnnn ggg          53
```

<210> SEQ ID NO 30
<211> LENGTH: 53
<212> TYPE: DNA
<213> ORGANISM: Artificial Sequence
<220> FEATURE:
<223> OTHER INFORMATION: TSO_cI03_N8_N5K3
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (46)..(50)
<223> OTHER INFORMATION: n is a, c, g, or t

<400> SEQUENCE: 30

```
aagcagtggt atcaacgcag agtacacgaa gacnnnnnnn nactcnnnnn ttt          53
```

<210> SEQ ID NO 31
<211> LENGTH: 53
<212> TYPE: DNA
<213> ORGANISM: Artificial Sequence
<220> FEATURE:
<223> OTHER INFORMATION: TSO_cI04_N8_N5K3
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (46)..(50)
<223> OTHER INFORMATION: n is a, c, g, or t

<400> SEQUENCE: 31

```
aagcagtggt atcaacgcag agtacagagt aggnnnnnnn nactcnnnnn ggg          53
```

<210> SEQ ID NO 32
<211> LENGTH: 53
<212> TYPE: DNA
<213> ORGANISM: Artificial Sequence
<220> FEATURE:
<223> OTHER INFORMATION: TSO_cI04_N8_N5K3
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (46)..(50)
<223> OTHER INFORMATION: n is a, c, g, or t

<400> SEQUENCE: 32
aagcagtggt atcaacgcag agtacagagt aggnnnnnnn nactcnnnnn ttt         53

<210> SEQ ID NO 33
<211> LENGTH: 53
<212> TYPE: DNA
<213> ORGANISM: Artificial Sequence
<220> FEATURE:
<223> OTHER INFORMATION: TSO_cI05_N8_N5K3
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (46)..(50)
<223> OTHER INFORMATION: n is a, c, g, or t

<400> SEQUENCE: 33
aagcagtggt atcaacgcag agtacaggtt acgnnnnnnn nactcnnnnn ggg         53

<210> SEQ ID NO 34
<211> LENGTH: 53
<212> TYPE: DNA
<213> ORGANISM: Artificial Sequence
<220> FEATURE:
<223> OTHER INFORMATION: TSO_cI05_N8_N5K3
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (46)..(50)
<223> OTHER INFORMATION: n is a, c, g, or t

<400> SEQUENCE: 34
aagcagtggt atcaacgcag agtacaggtt acgnnnnnnn nactcnnnnn ttt         53

<210> SEQ ID NO 35
<211> LENGTH: 53
<212> TYPE: DNA
<213> ORGANISM: Artificial Sequence
<220> FEATURE:
<223> OTHER INFORMATION: TSO_cI06_N8_N5K3
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (46)..(50)
<223> OTHER INFORMATION: n is a, c, g, or t

<400> SEQUENCE: 35
aagcagtggt atcaacgcag agtacatagg agtnnnnnnn nactcnnnnn ggg         53

<210> SEQ ID NO 36
<211> LENGTH: 53
<212> TYPE: DNA
<213> ORGANISM: Artificial Sequence
<220> FEATURE:
<223> OTHER INFORMATION: TSO_cI06_N8_N5K3
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (46)..(50)
<223> OTHER INFORMATION: n is a, c, g, or t

```
<400> SEQUENCE: 36
aagcagtggt atcaacgcag agtacatagg agtnnnnnnn nactcnnnnn ttt          53

<210> SEQ ID NO 37
<211> LENGTH: 64
<212> TYPE: DNA
<213> ORGANISM: Artificial Sequence
<220> FEATURE:
<223> OTHER INFORMATION: sc_WTS_RT_Primer_cID01
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 37
aagcagtggt atcaacgcag agtacaagtc acannnnnnn nacgttttt ttttttttt    60 ttvn                                                                64

<210> SEQ ID NO 38
<211> LENGTH: 64
<212> TYPE: DNA
<213> ORGANISM: Artificial Sequence
<220> FEATURE:
<223> OTHER INFORMATION: sc_WTS_RT_Primer_cID02
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 38
aagcagtggt atcaacgcag agtacacact cacnnnnnnn nacgttttt ttttttttt    60 ttvn                                                                64

<210> SEQ ID NO 39
<211> LENGTH: 64
<212> TYPE: DNA
<213> ORGANISM: Artificial Sequence
<220> FEATURE:
<223> OTHER INFORMATION: sc_WTS_RT_Primer_cID03
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 39
aagcagtggt atcaacgcag agtacacgaa gacnnnnnnn nacgttttt ttttttttt    60 ttvn                                                                64

<210> SEQ ID NO 40
<211> LENGTH: 64
<212> TYPE: DNA
<213> ORGANISM: Artificial Sequence
<220> FEATURE:
<223> OTHER INFORMATION: sc_WTS_RT_Primer_cID04
<220> FEATURE:
<221> NAME/KEY: misc_feature
```

```
<222> LOCATION: (34)..(41)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 40
aagcagtggt atcaacgcag agtacagagt aggnnnnnnn nacgttttt tttttttttt    60 ttvn                                                                 64

<210> SEQ ID NO 41
<211> LENGTH: 64
<212> TYPE: DNA
<213> ORGANISM: Artificial Sequence
<220> FEATURE:
<223> OTHER INFORMATION: sc_WTS_RT_Primer_cID05
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 41
aagcagtggt atcaacgcag agtacaggtt acgnnnnnnn nacgttttt tttttttttt    60 ttvn                                                                 64

<210> SEQ ID NO 42
<211> LENGTH: 64
<212> TYPE: DNA
<213> ORGANISM: Artificial Sequence
<220> FEATURE:
<223> OTHER INFORMATION: sc_WTS_RT_Primer_cID06
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 42
aagcagtggt atcaacgcag agtacatagg agtnnnnnnn nacgttttt tttttttttt    60 ttvn                                                                 64

<210> SEQ ID NO 43
<211> LENGTH: 64
<212> TYPE: DNA
<213> ORGANISM: Artificial Sequence
<220> FEATURE:
<223> OTHER INFORMATION: sc_WTS_RT_Primer_cID07
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 43
aagcagtggt atcaacgcag agtaccacat gtcnnnnnnn nacgttttt tttttttttt    60 ttvn                                                                 64
```

<210> SEQ ID NO 44
<211> LENGTH: 64
<212> TYPE: DNA
<213> ORGANISM: Artificial Sequence
<220> FEATURE:
<223> OTHER INFORMATION: sc_WTS_RT_Primer_cID08
<220> FEATURE:
<221> NAME/KEY: misc_feature
<222> LOCATION: (34)..(41)
<223> OTHER INFORMATION: n is a, c, g, or t
<220> FEATURE:
<221> NAME/KEY: misc_feature
<222> LOCATION: (64)..(64)
<223> OTHER INFORMATION: n is a, c, g, or t

<400> SEQUENCE: 44
aagcagtggt atcaacgcag agtaccatct gacnnnnnnn nacgttttt tttttttttt    60 ttvn    64

<210> SEQ ID NO 45
<211> LENGTH: 55
<212> TYPE: DNA
<213> ORGANISM: Artificial Sequence
<220> FEATURE:
<223> OTHER INFORMATION: M_cID01_D10_N5G3
<220> FEATURE:
<221> NAME/KEY: misc_feature
<222> LOCATION: (48)..(52)
<223> OTHER INFORMATION: n is a, c, g, or t

<400> SEQUENCE: 45
gtgagtgatg gttgaggatg tgtggagaag ttcgtgcddd ddddddnnn nnggg    55

<210> SEQ ID NO 46
<211> LENGTH: 55
<212> TYPE: DNA
<213> ORGANISM: Artificial Sequence
<220> FEATURE:
<223> OTHER INFORMATION: M_cID01_B10_N5T3
<220> FEATURE:
<221> NAME/KEY: misc_feature
<222> LOCATION: (48)..(52)
<223> OTHER INFORMATION: n is a, c, g, or t

<400> SEQUENCE: 46
gtgagtgatg gttgaggatg tgtggagaag ttcgtgcbbb bbbbbbnnn nnttt    55

<210> SEQ ID NO 47
<211> LENGTH: 55
<212> TYPE: DNA
<213> ORGANISM: Artificial Sequence
<220> FEATURE:
<223> OTHER INFORMATION: M_cID02_D10_N5G3
<220> FEATURE:
<221> NAME/KEY: misc_feature
<222> LOCATION: (48)..(52)
<223> OTHER INFORMATION: n is a, c, g, or t

<400> SEQUENCE: 47
gtgagtgatg gttgaggatg tgtggagatc gtgttctddd ddddddnnn nnggg    55

<210> SEQ ID NO 48
<211> LENGTH: 55
<212> TYPE: DNA
<213> ORGANISM: Artificial Sequence
<220> FEATURE:
<223> OTHER INFORMATION: M_cID02_B10_N5T3
<220> FEATURE:
<221> NAME/KEY: misc_feature

```
<222> LOCATION: (48)..(52)
<223> OTHER INFORMATION: n is a, c, g, or t

<400> SEQUENCE: 48
gtgagtgatg gttgaggatg tgtggagatc gtgttctbbb bbbbbbbnnn nnttt          55

<210> SEQ ID NO 49
<211> LENGTH: 55
<212> TYPE: DNA
<213> ORGANISM: Artificial Sequence
<220> FEATURE:
<223> OTHER INFORMATION: M_cID03_D10_N5G3
<220> FEATURE:
<221> NAME/KEY: misc_feature
<222> LOCATION: (48)..(52)
<223> OTHER INFORMATION: n is a, c, g, or t

<400> SEQUENCE: 49
gtgagtgatg gttgaggatg tgtggagatg tcttacgddd dddddddnnn nnggg          55

<210> SEQ ID NO 50
<211> LENGTH: 55
<212> TYPE: DNA
<213> ORGANISM: Artificial Sequence
<220> FEATURE:
<223> OTHER INFORMATION: M_cID03_B10_N5T3
<220> FEATURE:
<221> NAME/KEY: misc_feature
<222> LOCATION: (48)..(52)
<223> OTHER INFORMATION: n is a, c, g, or t

<400> SEQUENCE: 50
gtgagtgatg gttgaggatg tgtggagatg tcttacgbbb bbbbbbbnnn nnttt          55

<210> SEQ ID NO 51
<211> LENGTH: 55
<212> TYPE: DNA
<213> ORGANISM: Artificial Sequence
<220> FEATURE:
<223> OTHER INFORMATION: M_cID04_D10_N5G3
<220> FEATURE:
<221> NAME/KEY: misc_feature
<222> LOCATION: (48)..(52)
<223> OTHER INFORMATION: n is a, c, g, or t

<400> SEQUENCE: 51
gtgagtgatg gttgaggatg tgtggagcag tccaattddd dddddddnnn nnggg          55

<210> SEQ ID NO 52
<211> LENGTH: 55
<212> TYPE: DNA
<213> ORGANISM: Artificial Sequence
<220> FEATURE:
<223> OTHER INFORMATION: M_cID04_B10_N5T3
<220> FEATURE:
<221> NAME/KEY: misc_feature
<222> LOCATION: (48)..(52)
<223> OTHER INFORMATION: n is a, c, g, or t

<400> SEQUENCE: 52
gtgagtgatg gttgaggatg tgtggagcag tccaattbbb bbbbbbbnnn nnttt          55

<210> SEQ ID NO 53
<211> LENGTH: 55
<212> TYPE: DNA
<213> ORGANISM: Artificial Sequence
<220> FEATURE:
<223> OTHER INFORMATION: M_cID05_D10_N5G3
<220> FEATURE:
```

```
<221> NAME/KEY: misc_feature
<222> LOCATION: (48)..(52)
<223> OTHER INFORMATION: n is a, c, g, or t

<400> SEQUENCE: 53
gtgagtgatg gttgaggatg tgtggagcat tcgcgtcddd dddddddnnn nnggg          55

<210> SEQ ID NO 54
<211> LENGTH: 55
<212> TYPE: DNA
<213> ORGANISM: Artificial Sequence
<220> FEATURE:
<223> OTHER INFORMATION: M_cID05_B10_N5T3
<220> FEATURE:
<221> NAME/KEY: misc_feature
<222> LOCATION: (48)..(52)
<223> OTHER INFORMATION: n is a, c, g, or t

<400> SEQUENCE: 54
gtgagtgatg gttgaggatg tgtggagcat tcgcgtcbbb bbbbbbbnnn nnttt          55

<210> SEQ ID NO 55
<211> LENGTH: 55
<212> TYPE: DNA
<213> ORGANISM: Artificial Sequence
<220> FEATURE:
<223> OTHER INFORMATION: M_cID06_D10_N5G3
<220> FEATURE:
<221> NAME/KEY: misc_feature
<222> LOCATION: (48)..(52)
<223> OTHER INFORMATION: n is a, c, g, or t

<400> SEQUENCE: 55
gtgagtgatg gttgaggatg tgtggagccg atggttgddd dddddddnnn nnggg          55

<210> SEQ ID NO 56
<211> LENGTH: 55
<212> TYPE: DNA
<213> ORGANISM: Artificial Sequence
<220> FEATURE:
<223> OTHER INFORMATION: M_cID06_B10_N5T3
<220> FEATURE:
<221> NAME/KEY: misc_feature
<222> LOCATION: (48)..(52)
<223> OTHER INFORMATION: n is a, c, g, or t

<400> SEQUENCE: 56
gtgagtgatg gttgaggatg tgtggagccg atggttgbbb bbbbbbbnnn nnttt          55

<210> SEQ ID NO 57
<211> LENGTH: 55
<212> TYPE: DNA
<213> ORGANISM: Artificial Sequence
<220> FEATURE:
<223> OTHER INFORMATION: M_cID07_D10_N5G3
<220> FEATURE:
<221> NAME/KEY: misc_feature
<222> LOCATION: (48)..(52)
<223> OTHER INFORMATION: n is a, c, g, or t

<400> SEQUENCE: 57
gtgagtgatg gttgaggatg tgtggagccg gtaagctddd dddddddnnn nnggg          55

<210> SEQ ID NO 58
<211> LENGTH: 55
<212> TYPE: DNA
<213> ORGANISM: Artificial Sequence
<220> FEATURE:
<223> OTHER INFORMATION: M_cID07_B10_N5T3
```

-continued

```
<220> FEATURE:
<221> NAME/KEY: misc_feature
<222> LOCATION: (48)..(52)
<223> OTHER INFORMATION: n is a, c, g, or t

<400> SEQUENCE: 58
gtgagtgatg gttgaggatg tgtggagccg gtaagctbbb bbbbbbbnnn nnttt      55

<210> SEQ ID NO 59
<211> LENGTH: 55
<212> TYPE: DNA
<213> ORGANISM: Artificial Sequence
<220> FEATURE:
<223> OTHER INFORMATION: M_cID08_D10_N5G3
<220> FEATURE:
<221> NAME/KEY: misc_feature
<222> LOCATION: (48)..(52)
<223> OTHER INFORMATION: n is a, c, g, or t

<400> SEQUENCE: 59
gtgagtgatg gttgaggatg tgtggagccg tctgaacddd ddddddnnn nnggg       55

<210> SEQ ID NO 60
<211> LENGTH: 55
<212> TYPE: DNA
<213> ORGANISM: Artificial Sequence
<220> FEATURE:
<223> OTHER INFORMATION: M_cID08_B10_N5T3
<220> FEATURE:
<221> NAME/KEY: misc_feature
<222> LOCATION: (48)..(52)
<223> OTHER INFORMATION: n is a, c, g, or t

<400> SEQUENCE: 60
gtgagtgatg gttgaggatg tgtggagccg tctgaacbbb bbbbbbbnnn nnttt      55

<210> SEQ ID NO 61
<211> LENGTH: 30
<212> TYPE: DNA
<213> ORGANISM: Artificial Sequence
<220> FEATURE:
<223> OTHER INFORMATION: TSO_DropS
<220> FEATURE:
<221> NAME/KEY: misc_feature
<222> LOCATION: (28)..(30)
<223> OTHER INFORMATION: g is riboguanosine

<400> SEQUENCE: 61
aagcagtggt atcaacgcag agtgaatggg                                  30

<210> SEQ ID NO 62
<211> LENGTH: 35
<212> TYPE: DNA
<213> ORGANISM: Artificial Sequence
<220> FEATURE:
<223> OTHER INFORMATION: TSO_N5G3
<220> FEATURE:
<221> NAME/KEY: misc_feature
<222> LOCATION: (28)..(32)
<223> OTHER INFORMATION: n is a, c, g, or t

<400> SEQUENCE: 62
aagcagtggt atcaacgcag agtgaatnnn nnggg                            35

<210> SEQ ID NO 63
<211> LENGTH: 53
<212> TYPE: DNA
<213> ORGANISM: Artificial Sequence
<220> FEATURE:
```

<223> OTHER INFORMATION: RT primer cI_D10_N5K3
<220> FEATURE:
<221> NAME/KEY: misc_feature
<222> LOCATION: (46)..(50)
<223> OTHER INFORMATION: n is a, c, g, or t

<400> SEQUENCE: 63
gtgagtgatg gttgaggatg tgtggagaag tcacaddddd dddddnnnnn ggg            53

<210> SEQ ID NO 64
<211> LENGTH: 53
<212> TYPE: DNA
<213> ORGANISM: Artificial Sequence
<220> FEATURE:
<223> OTHER INFORMATION: RT primer cI_D10_N5K3
<220> FEATURE:
<221> NAME/KEY: misc_feature
<222> LOCATION: (46)..(50)
<223> OTHER INFORMATION: n is a, c, g, or t

<400> SEQUENCE: 64
gtgagtgatg gttgaggatg tgtggagaag tcacabbbbb bbbbbnnnnn ttt            53

<210> SEQ ID NO 65
<211> LENGTH: 35
<212> TYPE: DNA
<213> ORGANISM: Artificial Sequence
<220> FEATURE:
<223> OTHER INFORMATION: Second strand oligo
<220> FEATURE:
<221> NAME/KEY: misc_feature
<222> LOCATION: (28)..(32)
<223> OTHER INFORMATION: n is a, c, g, or t

<400> SEQUENCE: 65
aagcagtggt atcaacgcag agtgaatnnn nnggg                                35

<210> SEQ ID NO 66
<211> LENGTH: 23
<212> TYPE: DNA
<213> ORGANISM: Artificial Sequence
<220> FEATURE:
<223> OTHER INFORMATION: PCR primers

<400> SEQUENCE: 66
aagcagtggt atcaacgcag agt                                             23

<210> SEQ ID NO 67
<211> LENGTH: 24
<212> TYPE: DNA
<213> ORGANISM: Artificial Sequence
<220> FEATURE:
<223> OTHER INFORMATION: PCR primers

<400> SEQUENCE: 67
gtgagtgatg gttgaggatg tgtg                                            24

<210> SEQ ID NO 68
<211> LENGTH: 50
<212> TYPE: DNA
<213> ORGANISM: Artificial Sequence
<220> FEATURE:
<223> OTHER INFORMATION: RT Oligos

<400> SEQUENCE: 68
ttcttaccct attccactcc acaagtcaca hhhhhhhhhh actchhhhhh                50